(12) United States Patent
Manabe et al.

(10) Patent No.: US 7,070,282 B2
(45) Date of Patent: Jul. 4, 2006

(54) PROJECTION TYPE DISPLAY APPARATUS

(75) Inventors: Yuji Manabe, Kamakura (JP); Tetsuo Hattori, Yokohama (JP); Atsushi Sekine, Kasukabe (JP)

(73) Assignee: Nikon Corporation, Tokyo (JP)

( * ) Notice: Subject to any disclaimer, the term of this patent is extended or adjusted under 35 U.S.C. 154(b) by 125 days.

(21) Appl. No.: 10/874,186

(22) Filed: Jun. 24, 2004

(65) Prior Publication Data

US 2004/0263795 A1    Dec. 30, 2004

(30) Foreign Application Priority Data

| Jun. 25, 2003 | (JP) | ............................. 2003-180569 |
| Oct. 14, 2003 | (JP) | ............................. 2003-353267 |
| Jan. 13, 2004 | (JP) | ............................. 2004-005030 |

(51) Int. Cl.

| G03B 21/14 | (2006.01) |
| G03B 21/26 | (2006.01) |
| G03B 21/28 | (2006.01) |
| G02B 27/14 | (2006.01) |

(52) U.S. Cl. .......................... 353/20; 353/33; 353/34; 353/37; 353/99; 359/634

(58) Field of Classification Search ................. 353/20, 353/31, 33, 34, 37, 99; 359/634
See application file for complete search history.

(56) References Cited

U.S. PATENT DOCUMENTS

| 6,590,714 B1 | 7/2003 | Sugawara |
| 6,601,957 B1 | 8/2003 | Sugawara |
| 6,671,101 B1 | 12/2003 | Sugawara |
| 6,932,478 B1 * | 8/2005 | Lin et al. ...................... 353/31 |

FOREIGN PATENT DOCUMENTS

| JP | 10-39771 | 2/1998 |
| JP | 10-049069 | 2/1998 |
| JP | 2001-290010 | 10/2001 |
| JP | 2002-55210 | 2/2002 |
| JP | 2002-055305 | 2/2002 |
| JP | 2002-229125 | 8/2002 |

* cited by examiner

*Primary Examiner*—Melissa Jan Koval
(74) *Attorney, Agent, or Firm*—Morgan, Lewis & Bockius, LLP

(57) ABSTRACT

A projection type display apparatus includes a color separation optical system separating light emitted from a light source into first, second and third color light; reflection type light valves provided each in correspondence to one of the first through third color light; polarization beam splitters provided each in correspondence to one of the first through third color light, which executes polarization separation causing the first through third color light to enter the reflection type light valves, and analyzing light exiting from the reflection type light valves after being modulated; a color composition optical system having a first, a second and a third prism, wherein the analyzed first through third color light undergo color composition; and a projection lens projecting the resulting light from the color composition, and lengths of optical paths wherein each of the first through third color light travels are equal to one another.

27 Claims, 10 Drawing Sheets

PROJECTION TYPE DISPLAY APPARATUS

INCORPORATION BY REFERENCE

The disclosures of the following priority applications are herein incorporated by reference: Japanese Patent Application No. 2003-180569 filed Jun. 25, 2003 Japanese Patent Application No. 2003-353267 filed Oct. 14, 2003 Japanese Patent Application No. 2004-005030 filed Jan. 13, 2004

BACKGROUND OF THE INVENTION

1. Field of the Invention

The present invention relates to a projection type display apparatus.

2. Description of the Related Art

There is a projection type display apparatus known in the related art that executes color separation of light originating from a light source into light of three different colors, irradiates the light having undergone the color separation onto light valves via three polarization beam splitters each provided in correspondence to one of the three colors and uses a composite prism constituted with three triangular prisms as its color composition system (see Japanese Laid Open Patent Publication No. H 10-39771)

The light emitted from the light source is separated into three colors, red (R), green (G) and blue (B), at a cross dichroic mirror constituting the color separation optical system. The optical axis of the light in each of the three different colors resulting from the color separation and exiting the cross dichroic mirror along a specific direction becomes deflected by 90° at a deflecting mirror, and the light in each color becomes substantially parallel light which then advances upward.

The different colors of light each enter the polarization beam splitter provided in correspondence to the color to undergo a polarization split, and the polarized light transmitted through a polarization splitter film enters a reflection type light valve provided in correspondence to the specific color light. The light modulated at the reflection type light valve is then reflected and exits the reflection type light valve to re-enter the polarization beam splitter. The light having entered the polarization beam splitter is analyzed at the polarization beam splitter, and light reflected at the polarization splitter film then enters the color composition optical system. At the color composition optical system, which is constituted with three triangular prisms assuming different shapes, color composition of the different colors of light is achieved. The light having undergone the color composition is projected onto a screen through a projection lens. By adopting the projection type display apparatus structured as described above, the quality of the projected image does not deteriorate since it does not employ a color composition system constituted of a cross dichroic prism in which an adhesive normally present in a cross dichroic prism adversely affects the projected image.

SUMMARY OF THE INVENTION

However, the overall size of the projection type display apparatus assuming the structure described above, which includes the color composition optical system disposed above the color separation optical system, is bound to be significant.

According to the 1st aspect of the invention, a projection type display apparatus comprises: a color separation optical system that executes color separation to separate light emitted from a light source into first color light, second color light and third color light; reflection type light valves provided each in correspondence to one of the first color light through the third color light; polarization beam splitters provided each in correspondence to one of the first color light through the third color light, which execute polarization separation of the first color light, the second color light and the third color light resulting from the color separation, cause the first color light, the second color light and the third color light to enter the reflection type light valves and analyze light exiting the reflection type light valves after being modulated at the reflection type light valves; a color composition optical system having a first prism, a second prism and a third prism having shapes of substantially triangular columns with the first prism and the second prism bonded via a first dichroic film achieving characteristics whereby the first color light is transmitted and the second color light is reflected and the second prism and the third prism bonded via second dichroic film achieving characteristics whereby the third color light is reflected and the first color light and the second color light are transmitted, in which the analyzed first color light having entered through the first prism and the analyzed second color light having entered through the second prism undergo color composition at the first dichroic film and composite light constituted of the analyzed first color light and the analyzed second color light and the analyzed third color light having entered through the third prism undergo color composition at the second dichroic film; and a projection lens that projects light resulting from the color composition, and lengths of optical paths through which the first color light through the third color light travel from the light source to the reflection type light valves are equal to one another.

According to the 2nd aspect of the invention, in the projection type display apparatus according to the 1st aspect, it is preferred that: the analyzed third color light having entered through the third prism is first totally reflected at a side surface of the third prism facing opposite the projection lens and then undergoes the color composition at the second dichroic film to become combined with the composite light constituted of the analyzed first color light and the analyzed second color light.

According to the 3rd aspect of the invention, in the projection type display apparatus according to the 1st aspect, it is preferred that the color separation optical system comprises: a first dichroic mirror that executes color separation to separate the light emitted from the light source in to mixed light containing the first color light and the second color light and the third color light; and a second dichroic mirror disposed non-parallel with the first dichroic mirror, that executes color separation to separate the mixed light into the first color light and the second color light.

According to the 4th aspect of the invention, it is preferred that the projection type display apparatus according to the 3rd aspect further comprises: at least one deflecting mirror disposed in an optical path between the first dichroic mirror and the second dichroic mirror, which equalizes the length of the optical path from the light source to the reflection type light valve for the first color light and the length of the optical path from the light source to the reflection type light valve for the second color light; and at least two deflecting mirrors disposed in an optical path between the first dichroic mirror and the polarization beam splitter for the third color light, which equalize the length of the optical path from the light source to the reflection type light valve for the third color light and the length of the optical path from the light source to the reflection type light valve for the first color light.

According to the 5th aspect of the invention, in the projection type display apparatus according to the 4th aspect, it is preferred that: at least one of the deflecting mirrors disposed in the optical path between the first dichroic mirror and the polarization beam splitter for the third color light is set near the color composition optical system.

According to the 6th aspect of the invention, it is preferred that the projection type display apparatus according to the 4th aspect further comprises: a first field lens disposed in the optical path between the first dichroic mirror and the second dichroic mirror; and a second field lens disposed in the optical path between the first dichroic mirror and the polarization beam splitter for the third color light.

According to the 7th aspect of the invention, in the projection type display apparatus according to the 1st aspect, it is preferred that the color separation optical system comprises: a cross dichroic mirror achieved by disposing a first dichroic mirror having characteristics whereby the first color light and the second color light are reflected and the third color light is transmitted and a second dichroic mirror having characteristics whereby the third color light is reflected and the first color light and the second color light are transmitted so that the first dichroic mirror and the second dichroic mirror intersect each other at a right angle, which executes color separation to separate the light from the light source into mixed light containing the first color light and the second color light and the third color light; and a third dichroic mirror that executes color separation to separate the mixed light resulting from the color separation at the cross dichroic mirror into the first color light and the second color light.

According to the 8th aspect of the invention, it is preferred that the projection type display apparatus according to the 7th aspect further comprises: at least one deflecting mirror disposed in an optical path between the cross dichroic mirror and the third dichroic mirror, which equalizes the length of the optical path from the light source to the reflection type light valve for the first color light and the length of the optical path from the light source to the reflection type light valve for the second color light; and at least two deflecting mirrors disposed in an optical path between the cross dichroic mirror and the polarization beam splitter for the third color light, which equalize the length of the optical path from the light source to the reflection type light valve for the third color light and the length of the optical path from the light source to the reflection type light valve for the first color light.

According to the 9th aspect of the invention, in the projection type display apparatus according to the 8th aspect, it is preferred that: at least one of the two deflecting mirrors disposed in the optical path between the cross dichroic mirror and the polarization beam splitter for the third color light is set near the color composition optical system.

According to the 10th aspect of the invention, in the projection type display apparatus according to the 8th aspect, it is preferred that: the polarization beam splitters provided in conjunction with the first color light through the third color light each include two triangular prisms having a right angle isosceles triangle section; and light at a center of a light flux of each color light resulting from the color separation enters the polarization beam splitter perpendicular to an entry surface at the polarization beam splitter.

According to the 11th aspect of the invention, in the projection type display apparatus according to the 8th aspect, it is preferred that: the polarization beam splitters provided in conjunction with the first color light through the third color light each include two triangular prisms having a section with a shape of a right angle triangle having a right angle and an angle larger than 45°; and light at a center of a light flux of each color light resulting from the color separation enters a polarization splitter portion of the polarization beam splitter with an angle of incidence larger than 45°.

According to the 12th aspect of the invention, in the projection type display apparatus according to the 8th aspect, it is preferred that: the polarization beam splitters provided in conjunction with the first color light through the third color light each include two triangular prisms having an isosceles triangle section; and light at a center of a light flux of each color light resulting from the color separation enters the polarization beam splitter perpendicular to an entry surface at the polarization beam splitter and light at a center of a light flux of exiting light exits to the reflection type light valve along a direction perpendicular to an exit surface.

According to the 13th aspect of the invention, in the projection type display apparatus according to the 8th aspect, it is preferred that: an intersecting axis of the cross dichroic mirror having the first dichroic mirror and the second dichroic mirror is set perpendicular to a plane containing an optical axis of the color composition optical system; and light at a center of a light flux emitted from the light source advances parallel to the plane containing the optical axis of the color composition optical system.

According to the 14th aspect of the invention, in the projection type display apparatus according to the 8th aspect, it is preferred that: an intersecting axis of the cross dichroic mirror having the first dichroic mirror and the second dichroic mirror is set parallel to a plane containing an optical axis of the color composition optical system; and light at a center of a light flux emitted from the light source advances perpendicular to the plane containing the optical axis of the color composition optical system.

According to the 15th aspect of the invention, it is preferred that the projection type display apparatus according to the 7th aspect further comprises: two deflecting mirrors disposed in an optical path between the cross dichroic mirror and the third dichroic mirror, which equalize the length of the optical path from the light source to the reflection type light valve for the first color light and the length of the optical path from the light source to the reflection type light valve for the second color light; and two deflecting mirrors disposed in an optical path between the cross dichroic mirror and the polarization beam splitter for the third color light, which equalize the length of the optical path from the light source to the reflection type light valve for the third color light and the length of the optical path from the light source to the reflection type light valve for the first color light.

According to the 16th aspect of the invention, in the projection type display apparatus according to the 15th aspect, it is preferred that: the mixed light containing the first color light and the second color light resulting from the color separation at the cross dichroic mirror is deflected by 180° by the two deflecting mirrors disposed in the optical path between the cross dichroic mirror and the polarization beam splitter for the third color light.

According to the 17th aspect of the invention, in the projection type display apparatus according to the 16th aspect, it is preferred that: one of the two deflecting mirrors disposed in the optical path between the cross dichroic mirror and the polarization beam splitter for the third color light is set near the color composition optical system.

According to the 18th aspect of the invention, a projection type display apparatus comprises: a color separation optical system that executes color separation to separate light source light emitted from a light source into first color light, second color light and third color light; light valves provided each in correspondence to one of the first color light through the third color light; a color composition optical system having a first prism, a second prism and a third prism assuming shapes of substantially triangular columns with the first prism and the second prism bonded via a first dichroic film achieving characteristics whereby the first color light is transmitted and the second color light is reflected and the second prism and the third prism bonded via a second dichroic film achieving characteristics whereby the third color light is reflected and the first color light and the second color light are transmitted, in which the first color light having entered through the first prism and the second color light having entered the second prism undergo color composition at the first dichroic film and composite light constituted of the first color light and the second color light and the third color light having entered through the third prism undergo color composition at the second dichroic film; and a projection lens that projects light resulting from the color composition, and lengths of optical paths through which the individual colors of light travel from the light source to the light valves are equal to one another.

According to the 19th aspect of the invention, in the projection type display apparatus according to the 18th aspect, it is preferred that: the analyzed third color light having entered through the third prism is first totally reflected at a side surface of the third prism facing opposite the projection lens and then undergoes the color composition at the second dichroic film to become combined with the composite light constituted of the analyzed first color light and the analyzed second color light.

According to the 20th aspect of the invention, in the projection type display apparatus according to the 18th aspect, it is preferred that the color separation optical system comprises: a first dichroic mirror that executes color separation to separate the light emitted from the light source into mixed light containing the first color light and the second color light and the third color light; and a second dichroic mirror disposed non-parallel with the first dichroic mirror, that executes color separation to separate the mixed light into the first color light and the second color light.

According to the 21st aspect of the invention, it is preferred that the projection type display apparatus according to the 20th aspect further comprises: at least one deflecting mirror disposed in an optical path between the first dichroic mirror and the second dichroic mirror, which equalizes the length of the optical path from the light source to the light valve for the first color light and the length of the optical path from the light source to the light valve for the second color light; at least two deflecting mirrors disposed in an optical path between the first dichroic mirror and the light valve for the third color light, which equalize the length of the optical path from the light source to the light valve for the third color light and the length of the optical path from the light source to the light valve for the first color light.

According to the 22nd aspect of the invention, in the projection type display apparatus according to the 21st aspect, it is preferred that: at least one of the two deflecting mirrors disposed in the optical path between the first dichroic mirror and the light valve for the third color light is set near the color composition optical system.

According to the 23rd aspect of the invention, in the projection type display apparatus according to the 18th aspect, it is preferred that the color separation optical system comprises: a cross dichroic mirror constituted by disposing a first dichroic mirror achieving characteristics whereby the first color light and the second color light are reflected and the third color light is transmitted and a second dichroic mirror achieving characteristics whereby the third color light is reflected and the first color light and the second color light are transmitted so that the first dichroic mirror and the second dichroic mirror intersect each other at a right angle, which executes color separation to separate the light from the light source into mixed light containing the first color light and the second color light and the third color light; and a third dichroic mirror that executes color separation to separate the mixed light resulting from the color separation at the cross dichroic mirror into the first color light and the second color light.

According to the 24th aspect of the invention, it is preferred that the projection type display apparatus according to the 23rd aspect further comprises: at least one deflecting mirror disposed in an optical path between the cross dichroic mirror and the third dichroic mirror, which equalizes the length of the optical path from the light source to the light valve for the first color light and the length of the optical path from the light source to the light valve for the second color light; at least two deflecting mirrors disposed in an optical path between the cross dichroic mirror and the light valve for the third color light, which equalize the length of the optical path from the light source to the light valve for the third color light and the length of the optical path from the light source to the light valve for the first color light.

According to the 25th aspect of the invention, in the projection type display apparatus according to the 24th aspect, it is preferred that: at least one of the two deflecting mirrors disposed in the optical path between the cross dichroic mirror and the light valve for the third color light is set near the color composition optical system.

According to the 26th aspect of the invention, in the projection type display apparatus according to the 1st aspect, it is preferred that: the color separation optical system and the color composition optical system are disposed within a single plane.

According to the 27th aspect of the invention, in the projection type display apparatus according to the 18th aspect, it is preferred that: the color separation optical system and the color composition optical system are disposed within a single plane.

DESCRIPTION OF PREFERRED EMBODIMENTS

The following is an explanation of the embodiments of the present invention, given in reference to the drawings.

First Embodiment

Figure 1:
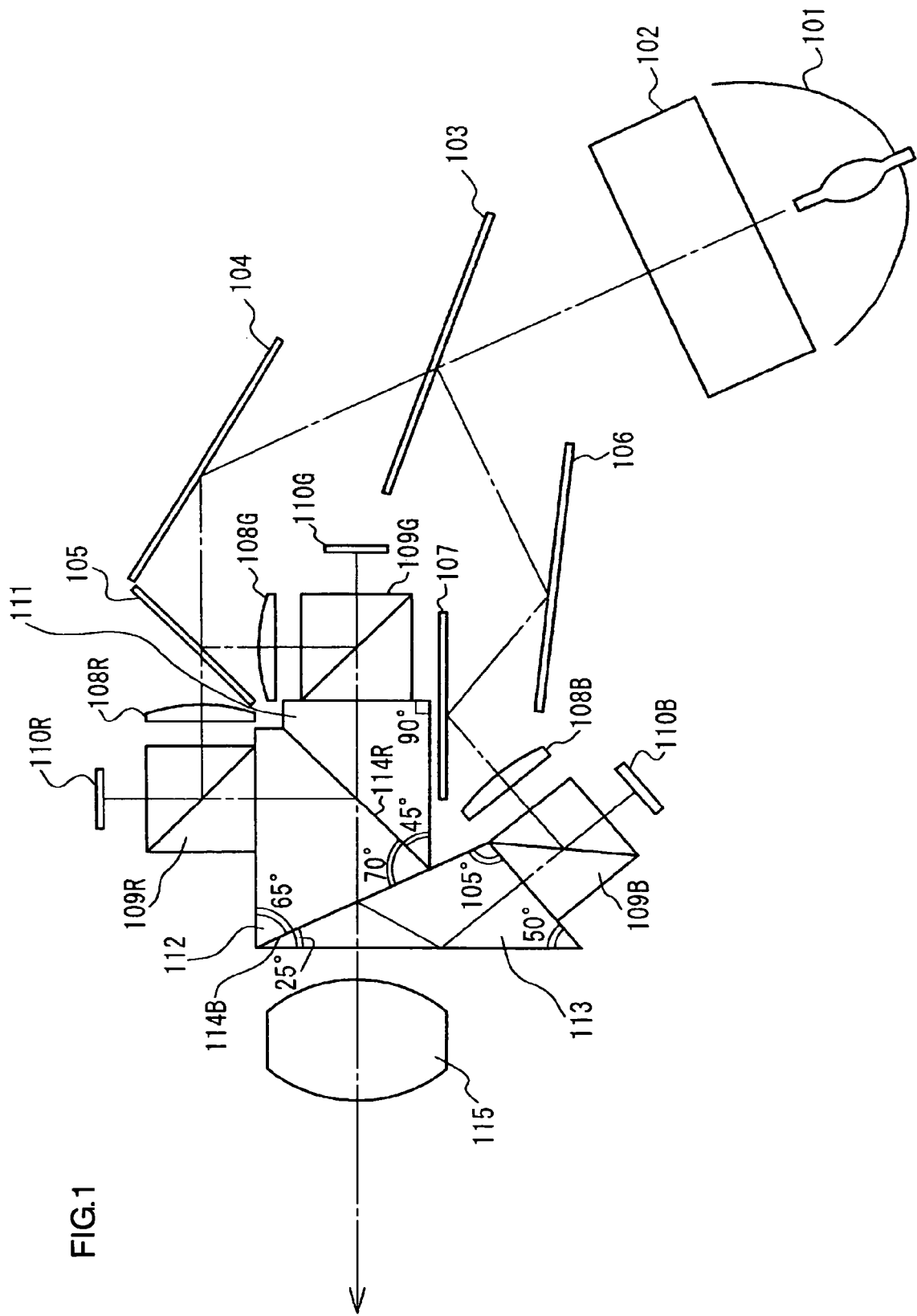
FIG. 1 is a plan view showing the structure adopted i a first embodiment of the projection type display apparatus.
Figure 2:
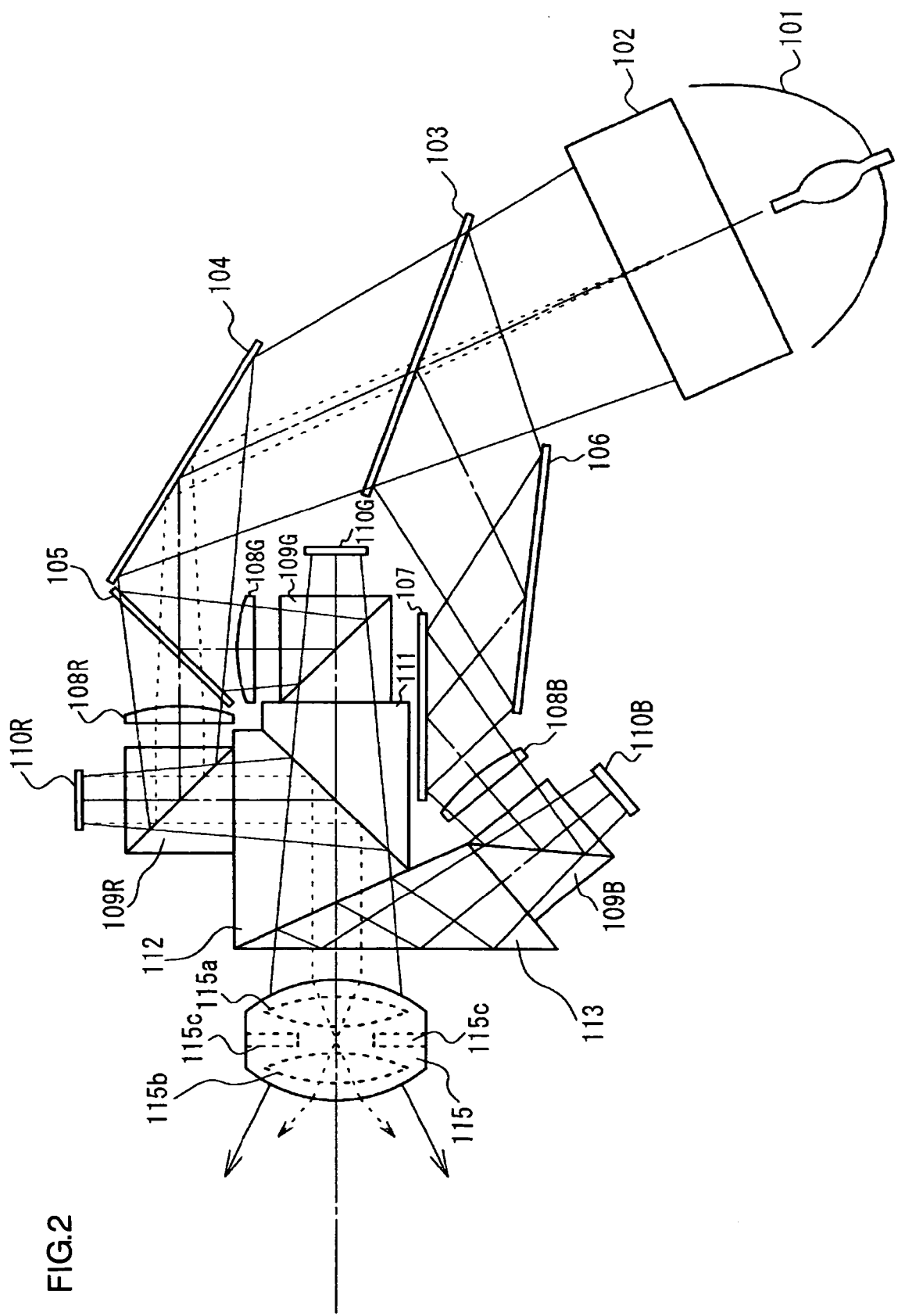
FIG. 2 is a diagram of beams in the projection type display apparatus achieved in the first embodiment.

The first embodiment is now explained in reference to FIGS. 1 and 2. FIG. 1 is a plan view showing the structure of the projection type display apparatuses achieved in the embodiment and FIG. 2 is a diagram of the beams in the projection type display apparatus.

A light flux emitted from a light source 101 constituted of a lamp and a concave mirror having a parabolic surface contour enters a polarization conversion illuminating device 102 where it is converted to become polarized light which oscillates along a direction perpendicular to the drawing sheet surface. Although not shown in FIG. 1, the polarization conversion illuminating device 102 is constituted with a first lens plate having a plurality of lenses arranged in a matrix pattern to split the light flux from the light source into a plurality of intermediate light fluxes, a second lens plate having a plurality of lenses arranged in a similar manner at positions substantially matching the focal points of lenses at the first lens plate and a polarization conversion unit that converts light from a plurality of light source images formed on the lenses at the second lens plate to singularly polarized light.

The polarization conversion unit includes an array of a plurality of sets of elements, each set having a polarization element that allows part of the light from the light source which has been polarized in a specific manner to be transmitted through and reflects polarized light which has been polarized perpendicularly to the polarized light for transmission and a reflection element that deflects the reflected light along a direction matching the direction of the polarized light being transmitted, disposed alternately to each other in combination, and the polarization conversion unit also includes a half wave phase plate disposed at the exit surface through which either the transmitted polarized light or the reflected polarized light exits. As a result, all the exiting light is converted to polarized light that oscillates along a single direction. The polarization conversion illuminating device 102 also includes condenser lenses that illuminate light valves 110R, 110G and 110B to be detailed later by super imposing the polarized light onto the light valves 110R, 110G and 110B.

The light having exited the polarization conversion illuminating device 102 enters a dichroic mirror 103 disposed so as to allow the optical axis of the light to achieve an angle of incidence of 45° and having characteristics whereby B (blue) color light is reflected and R (red) color light and G (green) color light are transmitted, undergoes color separation to be separated into B light to be reflected and mixed light containing R light and G light to be transmitted. The mixed light containing the R light and the G light resulting from the color separation enters a deflecting mirror 104 disposed so as to allow the optical axis of the mixed light to achieve an angle of incidence of 57.5° and is reflected. The reflected light then enters a dichroic mirror 105 disposed so as to allow the optical axis to achieve an angle of incidence of 45° and having characteristics whereby G light is reflected and R light is transmitted.

At the dichroic mirror 105, the mixed light is separated into G light to be reflected and R light to be transmitted. The R light and the G light having undergone color separation at the dichroic mirror 105 respectively travel through field lenses 108R and 108G and enter polarization beam splitters 109R and 109G. The polarization beam splitters 109R and 109G are each constituted by bonding two triangular prisms each having a section with a right angle isosceles triangle shape at surfaces of the prisms facing opposite the right angle apex via a polarization splitter portion. The R light and the G light having entered the polarization beam splitters 109R and 109G with the optical axes of the incident light each forming a right angle to the corresponding entry surface, are reflected at the polarization splitter portions, exit a long the direction perpendicular to the optical axes of the incident light and respectively enter the reflection type light valves 110R and The B light reflected at the dichroic mirror 103 enters a deflecting mirror 106 disposed so as to allow the optical axis of the B light to form an angle of incidence of 57.7° and is reflected. The reflected B light enters a deflecting mirror 107 disposed so as to allow the optical axis of the B light to form an angle of incidence of 50° and is reflected. The reflected B light travels through a field lens 108B and then enters a polarization beam splitter 109B. The polarization beam splitter 109B adopts a structure identical to those of the polarization beam splitters 109R and 109G. The light having entered the polarization beam splitter 109B is reflected at its polarization splitter portion, exits along the direction perpendicular to the optical axis of the incident light and then enters the reflection type light valve 110B.

The color separation optical system is constituted with the dichroic mirror 103, the deflecting mirrors 104, 106 and 107 and the dichroic mirror 105. The dichroic mirror 103 and the dichroic mirror 105 are disposed by ensuring that they do not lie parallel to each other. If the dichroic mirror 103 and the dichroic mirror 105 are set parallel to each other, the lengths of the optical paths of the light in the different colors extending from the light source 101 to the reflection type light valves which are to be detailed later, cannot be set equal to one another. The B light resulting from the color separation achieved with the dichroic mirror 103 is reflected at the two deflecting mirrors and then enters the reflection type light valve via the polarization beam splitter. The mixed light containing the R light and the G light resulting from the color separation at the dichroic mirror 103 travels through the deflecting mirror 104 and then undergoes color separation at the dichroic mirror 105. The R light and the G light resulting from the color separation then travel through the polarization beam splitters 109R and 109G provided in correspondence to the individual colors and then enter the reflection type light valves 110R and 110G respectively.

By adopting this structure, the lengths of the optical paths corresponding to the individual colors, extending from the light source to the light valves, can be set equal to one another. The light having entered each of the reflection type light valves 110R, 110G 110B for the different colors of light is modulated by a signal for the corresponding light and is emitted as mixed light constituted of modulated light with the direction along which the polarized light oscillates having been altered and unmodulated light with the direction along which the polarized light oscillates remaining unchanged. The emitted light reenters the polarization beam splitter 109R, and 109G or 109B provided for the light in the corresponding color, where the modulated light is analyzed as transmitted light. The individual colors of light and then enter the color composition optical system, which is a composite prism constituted of prisms 112, 111 and 113, via different prisms to undergo color composition. It is to be noted that the term of "color of light" may be referred to as the term of "colored light".

The G light enters the prism 111 which is a substantially right angle isosceles triangle prism with one of the 45° apexes of the right angle isosceles triangle partially cut off, as shown in FIG. 1, so as to create a space where the field lens 108G and the dichroic mirror 105 are disposed. The R light enters the prism 112 which is substantially a triangular prism having a 65° apex, a 70° apex and a 45° apex. Part of the 45° apex is cut off as shown in FIG. 1 so as to create a space where the field lens 108R and the dichroic mirror 105 are disposed. At the surface of the prism 112 facing opposite the 65° apex, a dichroic film 114R achieving characteristics whereby R light is reflected and G light is transmitted is formed, and this surface and the surface of the prism 111 facing opposite the right angle apex are bonded to each other by using an optical adhesive. The B light enters the prism 113, which is substantially a triangular prism having a 25° apex, a 50° apex and a 105° apex, with a dichroic film 114B achieving characteristics whereby B light is reflected and R light and G light are transmitted formed at the surface of the prism 113 facing opposite its 50° apex. This surface and the surface of prism 112 located between the 65° apex and the 70° apex are bonded to each other with an optical adhesive, and thus, a composite prism for color composition is achieved.

As shown in FIG. 1, the analyzed G light enters the prism 111 through the surface facing opposite a 45° apex with the optical axis of the incident light forming a right angle to the entry surface, enters the dichroic film 114R located between the prism 111 and the prism 112 with the optical axis forming a 45° angle of incidence, is transmitted through the dichroic film 114R, enters and then exits the prism 112, enters the dichroic film 114B located between the prism 113 and the prism 112 with the optical axis forming a 25° angle of incidence, is transmitted through the dichroic film 114B and finally enters and exits the prism 113.

The analyzed R light enters the prism 112 through the surface of the prism 112 facing opposite its 70° apex with the optical axis of the incident light forming a right angle to the entry surface, is reflected at the dichroic film 114R, is combined with the G light and exits the prism 112 along the direction perpendicular to the optical axis of the incident light, is transmitted through the dichroic film 114B located between the prism 113 and the prism 112 and finally enters and exits the prism 113. The analyzed B light enters the prism 113 through the surface of the prism 113 facing opposite its 25° apex with the optical axis of the incident light forming a right angle to the entry surface, is totally reflected at the surface facing opposite the 105° apex, is reflected at the dichroic film 114B and becomes combined with the R light and the G light. The light resulting from the color composition then exits the surface facing opposite the dichroic mirror 105 apex with its optical axis extending perpendicular to the surface. The lengths of the optical paths through which the G light having entered the prism 111 and the R light having entered the prism 112 travel to the dichroic film 114R at the composite prism are equal to each other. In addition, the lengths of the optical paths from the entry surfaces at which the R light and the G light enter the respective prisms 112 and 111 to become combined at the dichroic film 114R to the dichroic film 114B are set equal to the length of the optical path from the entry surface at which the B light enters the prism 113 to the dichroic film 114B to which the B light reaches after being totally reflected. The light resulting from the color composition at the composite prism then exits the composite prism and enters a projection lens 115 to be projected in an enlargement onto a screen (not shown).

Next, in reference to the light beam diagram presented in FIG. 2, the optical path of the light in each color is explained. In FIG. 2, the one-point chain lines indicate the optical axes, the solid lines indicate the outermost beams of light in the individual colors and the dotted lines indicate the outermost beams in the light flux of the R light in the principal ray defined at an aperture 115_c_ in the projection lens 115. The projection lens 115 comprises a front lens group 115_a_ located on the entry side where the light enters the projection lens 115, a rear lens group 115_b_ located on the exit side and the aperture 115_c_ disposed at the focal point position of the front lens group 115_a_. The principal ray of each color light defined at the aperture 115_c_ achieves so-called telecentricity whereby it runs parallel to the optical axis through the optical path between entry surface at the projection lens 115 and the field lens 108R, 108G or 108B provided in correspondence to the color of the light. While the principal rays of the G light and the B light are not included in the illustration presented in FIG. 2, they, too, achieve telecentricity through the optical paths between the projection lens 115 and the field lenses 108G and 108B, as does the R light. When the optical paths are reversed from the field lenses 108R, 108G and 108B, the principal rays are condensed at the lens on the optical axis at the second lens plate of the polarization conversion illuminating device 102.

In the projection type display apparatus achieved in the embodiment, the light originating from the light source is separated into R light, G light and B light at the two dichroic mirrors 103 and 105, and each color light enters the corresponding reflection type light valve via the polarization beam splitter provided in correspondence to the color of the light by traveling through an optical path, the length of which is equal to lengths of the optical paths of the light in the other colors. The modulated light exiting the reflection type light valve is analyzed at the corresponding polarization beam splitter, and then the different colors of light undergo color composition at the composite prism constituted by bonding together triangular prisms with sectional shapes different from one another, with dichroic films at which the color composition is achieved formed at specific side surfaces of the prisms in such a manner that the dichroic films do not intersect each other. Since the light composition optical system is achieved without using a cross dichroic prism, no inconsistency in the projected image occurs due to the adhesive layer which would be present at the center of such a cross dichroic prism, and thus, a projection type display apparatus capable of projecting a uniform projected image can be provided. In addition, since the lengths of the optical paths in the illumination optical system corresponding to the individual colors of light are set equal to one another, inconsistency in the illumination that would result from different optical path lengths can be avoided. Since the dichroic mirrors constituting the color separation optical system and the composite prism constituting the color composition optical system are disposed on a single plane, the overall size of the projection type display apparatus can be reduced.

It is to be noted that while the light originating from light source 101 travels through the polarization conversion illuminating device 102, undergoes color separation at the dichroic mirror 103 to become separated into B light reflected at the dichroic mirror 103 and R light and G light transmitted through the dichroic mirror 103 in the embodiment explained above, the color of the light that is reflected and thus becomes separated at the dichroic mirror 103 may be R light and mixed light containing B light and G light may instead be transmitted to advance ahead. In such a case, the deflecting mirror 104 should guide the mixed light containing G light and the B light to the dichroic mirror 105 which reflects G light and allows the B light to be transmitted and the G light and the B light which have become separated from each other at the dichroic mirror 105 should individually travel through the respective polarization beam splitters to enter the reflection type light valves provided in correspondence to the individual colors. Accordingly, the dichroic film formed between the prism 111 and the prism 112 should have characteristics whereby G light is transmitted and B light is reflected and the dichroic film formed between the prism 112 and the prism 113 should have characteristics whereby the R light is reflected and G light and B light are transmitted.

In addition, a projection type display apparatus having a color separation optical system that achieves similar advantages can also be provided by adopting a structure in which the positions of the light source 101 and the polarization conversion illuminating device 102 in FIG. 1 are altered so as to separate the light into third color light that enters and is transmitted through the dichroic mirror 103 and mixed light containing first color light and second color light that are reflected at the dichroic mirror 103, instead of separating the light from the light source exiting the polarization conversion illuminating device into third color light reflected at the dichroic mirror and mixed light containing first color light and second color light that are transmitted through the dichroic mirror.

Figure 7:
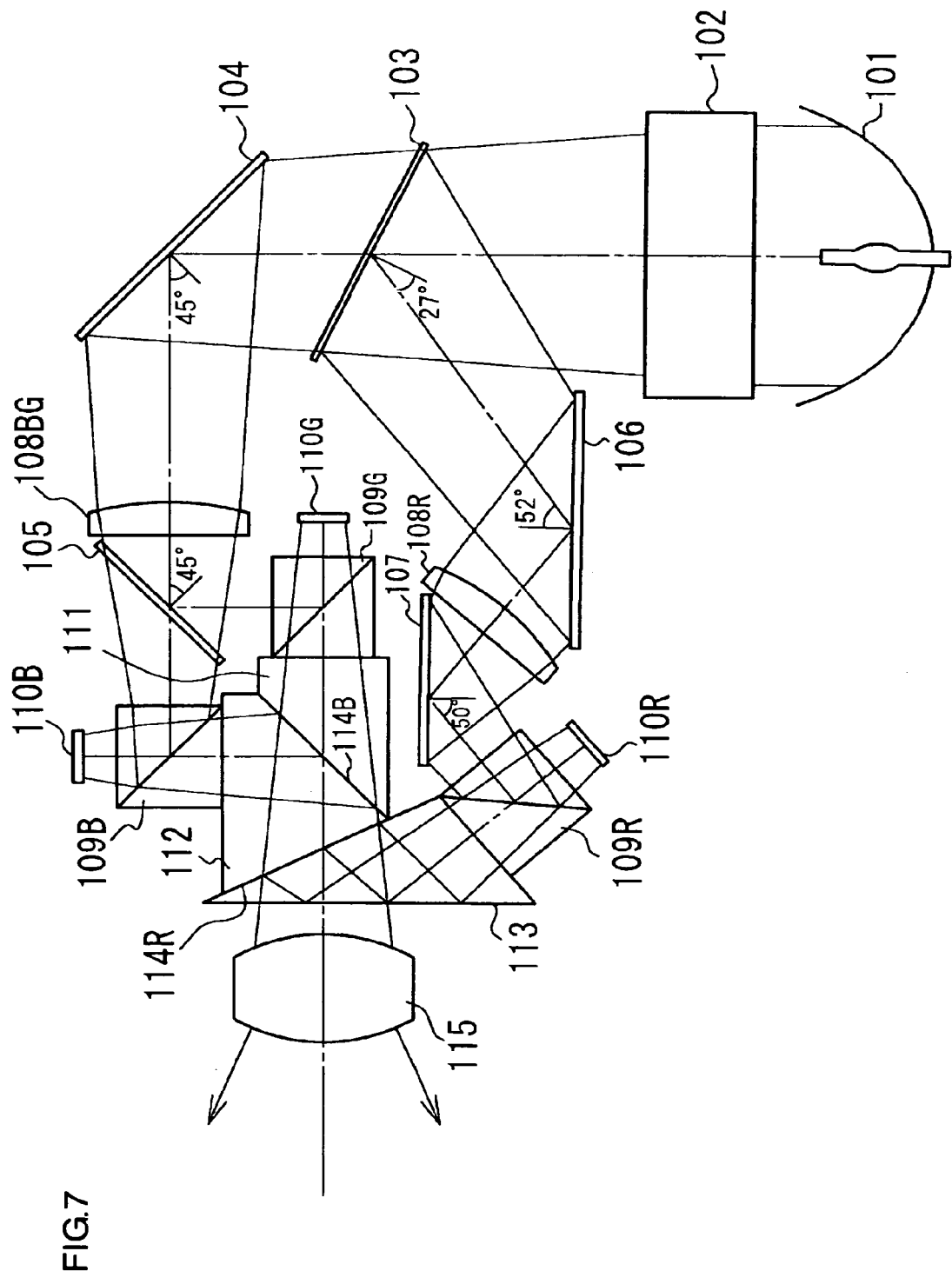
FIG. 7 is a diagram of beams in a variation of the projection type display apparatus achieved in the first embodiment.

FIG. 7 presents an example of a variation of the embodiment. This variation differs from the display apparatus shown in FIG. 1 in the angle of incidence with which the light from the light source enters the dichroic mirror 103 and also in the positional arrangement of field lenses as 108BG and 108R.

The light from the light source oscillating along the direction perpendicular to the drawing sheet surface, which has exited the polarization conversion illuminating device 102, enters the dichroic mirror 103 having characteristics whereby R light is reflected and G light and B light are transmitted with its optical axis achieving an angle of incidence of 27° and becomes separated into R light to be reflected and mixed light of G light and B light to be transmitted. The R light having become separated enters the deflecting mirror 106 with its optical axis achieving a 52° angle of incidence and is reflected. The reflected R light enters the deflecting mirror 107 with a 50° angle of incidence via the R light field lens 108R, is reflected at the deflecting mirror 107 and then enters the polarization beam splitter 109R. The mixed light of the G light and the B light having been transmitted through the dichroic mirror 103, on the other hand, enters the deflecting mirror 104 with its optical axis achieving a 45° angle of incidence and is reflected. The reflected mixed light travels through the field lens 108BG and enters the dichroic mirror 105 at which G light is reflected and B light is transmitted through, with its optical axis achieving a 45° angle of incidence to become separated into G light to be reflected and B light to be transmitted through.

In this variation, too, the lengths of the optical paths of the different colors of light extending from the light source to the light valves corresponding to the individual colors of light are equal to one another. It is to be noted that in the optical paths of the different color so flight extending from the field lenses 108R and 108BG to the projection lens 115, the principal rays defined at the aperture disposed inside the projection lens 115 achieve telecentricity whereby they run parallel to the optical axes of the corresponding colors of light. In addition, the dichroic mirror 103 at which the R light is reflected is disposed so as to achieve an angle of incidence of 27° which is smaller than the corresponding angle of incidence achieved in the structure shown in FIG. 1 and, as a result, the extent of color shading occurring during the color separation can be reduced. The extent of color shading occurring during the color separation at the dichroic mirror 105, too, is lowered by disposing the dichroic mirror 105 at a position at which telecentricity is achieved. The projection type display apparatus in the variation achieves advantages similar to those of the projection type display apparatus explained in reference to FIG. 1. It achieves an added advantage of an even better quantity projected image since the extent of color shading in the different colors of light resulting from the color separation is reduced.

Second Embodiment

Figure 3:
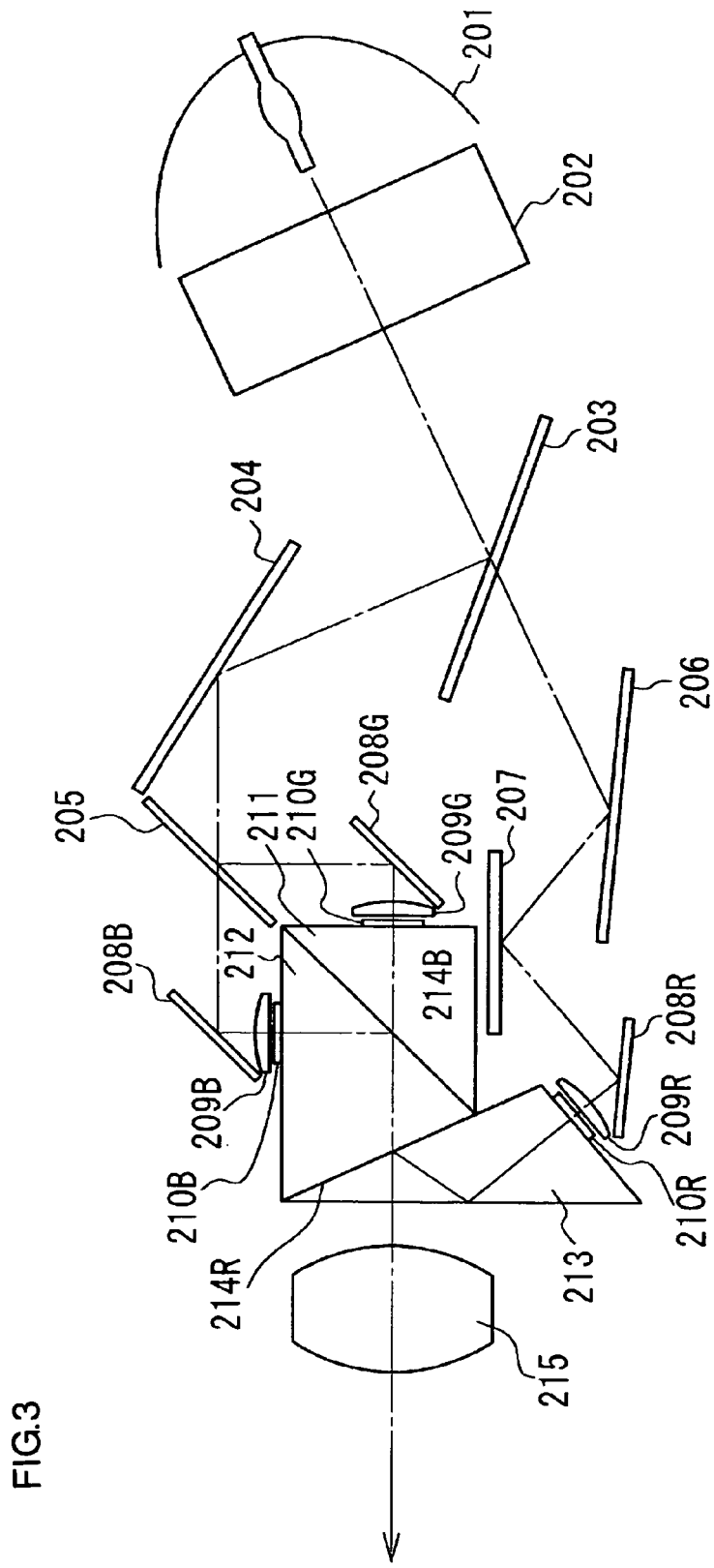
FIG. 3 is a plan view showing the structure adopted in a second embodiment of the projection type display apparatus.

The projection type display apparatus achieved in the second embodiment is now explained in reference to the plan view in FIG. 3 showing its structure. While reflection type light valves are employed as light valves in the projection type display apparatus in the first embodiment, the light valves used in this embodiment are transmission type light valves.

A light flux emitted from a light source 201 constituted of a lamp and a concave mirror having a parabolic surface contour enters a polarization conversion illuminating device 202 where it is converted to become polarized light which oscillates along the direction perpendicular to the drawing sheet surface and exits the polarization conversion illuminating device 202. Since the polarization conversion illuminating device 202 adopts a structure identical to that of the polarization conversion illuminating device 102 in the first embodiment, its explanation is omitted. The light having exited the polarization conversion illuminating device 202 enters a dichroic mirror 203 having characteristics where by mixed color light with B light and G light is reflected and R light is transmitted with its optical axis achieving a 45° angle of incidence, and becomes separated into mixed color light containing B light and G light to be reflected and R light to be transmitted through. The mixed light of the B light and the G light resulting from the color separation enters and is reflected at a deflecting mirror 204 disposed so as to allow the optical axis of the light to achieve a 57.5° angle of incidence, enters a dichroic mirror 205 disposed so as to allow the optical axis to achieve a 45° angle of incidence and having characteristics whereby G light is reflected and B light is transmitted through and becomes separated into G light to be reflected and B light to be transmitted and advance ahead. The B light and the G light having become separated at the dichroic mirror 205 respectively enter deflecting mirrors 208B and 208G each disposed so as to allow the optical axis to achieve a 45° angle of incidence, are reflected at the respective deflecting mirrors and enter transmission type light valves 210B and 210G via field lenses 209B and 209G respectively.

The R light having become separated at the dichroic mirror 203 is first reflected at a deflecting mirrors 206 disposed so as to allow the optical axis of the light to achieve a 57.5° angle of incidence, is reflected a deflecting mirror 207 disposed so as to allow the optical axis to achieve a 50° angle of incidence, is reflected at a deflecting mirror 208R disposed so as to allow the optical axis to achieve an angle of incidence of 45° and then enters a transmission type light valve 210R via a field lens 209R. Since a color separation optical system similar to that in the first embodiment is utilized the lengths of the optical paths of the different colors of light, extending from the light source to the respective light valves are equal to one another.

Although not shown, a polarizing plate is disposed both on the entry surface side and on the exit surface side of each light valve provided in conjunction with light in a specific color, and a liquid crystal panel is held between these polarizing plates. The degree of polarization of the light having entered each of the transmission type light valves 210B, 210G and 210R provided in correspondence to the individual colors of light is improved at the polarizing plate disposed on the entry surface side, and then the light enters the liquid crystal panel. The light then becomes modulated by a signal for the corresponding color light at the liquid crystal panel and exits the liquid crystal panel as mixed light containing modulated light achieved by altering the direction along which the polarized light oscillates and unmodulated light constituted of polarized light oscillating along a direction matching the oscillating direction of the incident light. The unmodulated light is then absorbed at the polarizing plate disposed on the exit surface side, but the modulated light is analyzed, is transmitted and exits the polarizing plate. The different colors of analyzed light having exited the light valves provided in correspondence to the individual colors of light enter the color composition optical system, which is a composite prism constituted of prisms 211, 212 and 213, through different prisms from one another, to undergo color composition. The shapes of the prisms 211, 212 and 213 constituting the composite prism for color composition in the embodiment are substantially identical to those of the prisms 111, 112 and 113 used in the first embodiment. However, since the field lenses are disposed at positions different from those assumed in the first embodiment, none of the apexes at the prisms 211 and 212 shown in FIG. 3 is cut off.

In the embodiment, the composite prism is achieved by forming a dichroic film 214B that reflects B light and allows an G light to be transmitted between the prisms 211 and 212, forming a dichroic film 214R having characteristics whereby R light is reflected and G light and B light are transmitted between the prisms 212 and 213 and bonding the three prisms 211, 212 and 213 together. As shown in FIG. 3, the analyzed G light enters the prism 211 through the surface facing opposite the 45° apex, is transmitted through the dichroic film 214B located between the prism 211 and the prism 212, enters and exits the prism 212, is transmitted through the dichroic film 214B located between the prism 213 and the prism 212, and then enters and exits the prism 213. The analyzed B light enters the prism 212 through the surface facing opposite its 70° apex, is reflected at the dichroic from 214B, becomes combined with the G light and exits the prism 212. Is it is then transmitted through the dichroic film 214R between the prism 213 and the prism 212 before entering and exiting the prism 213. The analyzed R light enters the prism 213 through the surface facing opposite its 25° apex, is totally reflected at the surface facing opposite the dichroic mirror 105° apex, is reflected at the dichroic film 214R and becomes combined with the R light and the G light in the prism 213 before exiting the prism. The light having become combined at the composite prism and having exited the composite prism then enters a projection lens 215 and is projected onto a screen (not shown).

In the projection type display apparatus achieved in this embodiment, too, an aperture is disposed in the projection lens 215, and the prisms constituting the color composition composite prism and the light valves corresponding to the individual colors of light disposed within the optical paths extending between the projection lens and the field lenses 209R, 209G and 209B provided in conjunction with the different colors of light are set at positions at which the principal rays defined at the aperture achieve telecentricity, i.e., at positions at which the principal rays extend parallel to the optical axes.

The lengths of the optical paths through which the R light, the G light and the B light travel to the respective light valves in the projection type display apparatus achieved in the embodiment by using transmission type light valves can be set equal to one another as in the first embodiment. In addition, since a color composition optical system constituted of a composite prism having a plurality of dichroic films for achieving color composition disposed so as not to intersect one another is employed, none of the problems of cross dichroic prisms occur, and a uniform projected image can be projected even when smaller pixels are used at the light valves. In addition, the color separation may be achieved by using the cross dichroic mirror and the dichroic mirror to be explained later in reference to the third embodiment in place of the dichroic mirrors 203 and 205 used in the embodiment. In such a case, too, the lengths of the optical paths from the light source to the light valves corresponding to the individual colors of light, i.e., the R light, the G light and the B light, can be set equal to one another.

Third Embodiment

Figure 4:
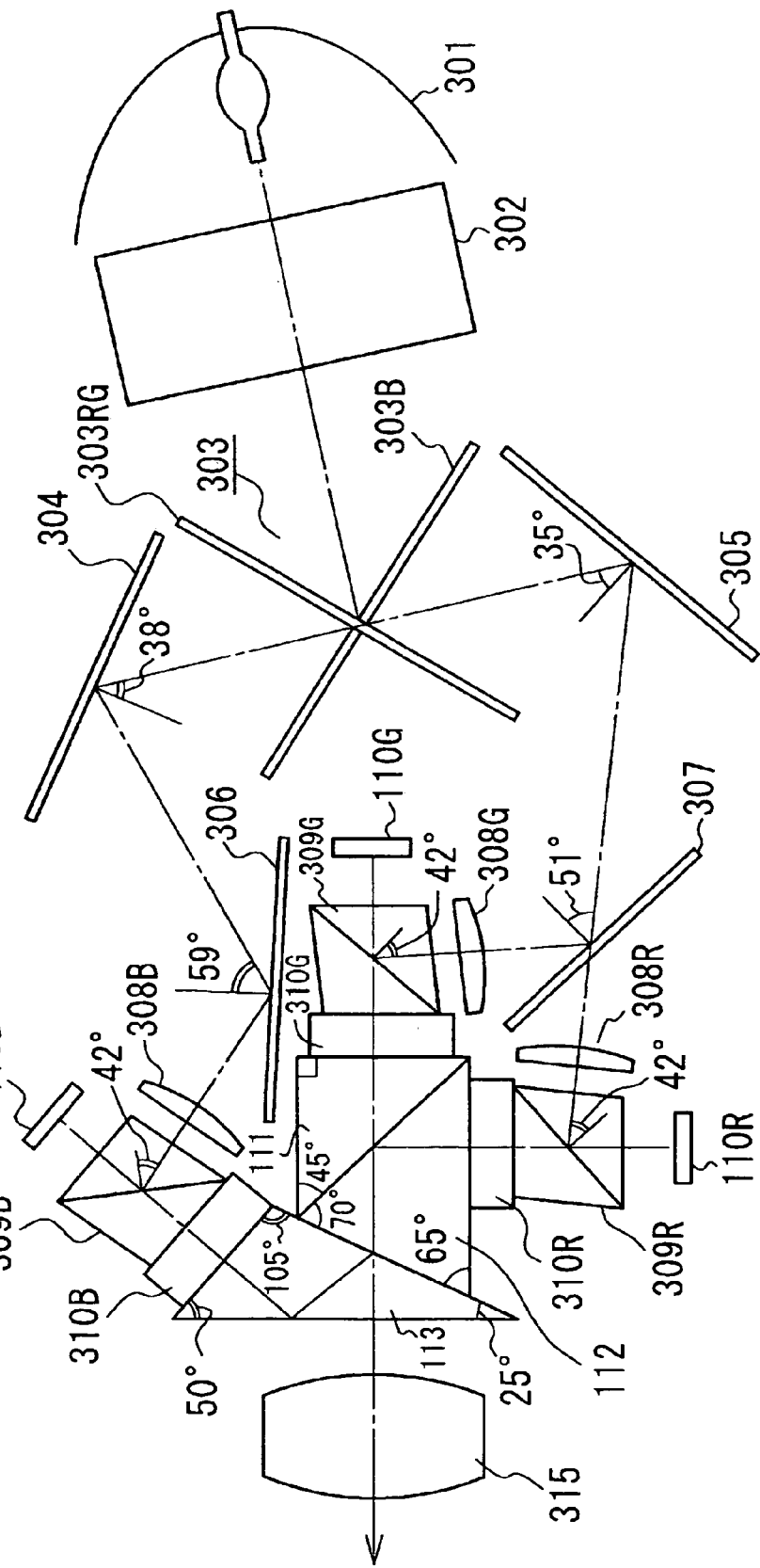
FIG. 4 is a plan view showing the structure adopted in a third embodiment of the projection type display apparatus.

FIG. 4 is a plan view showing the structure adopted in the projection type display apparatus in the third embodiment. The projection type display apparatus in this embodiment differs from the projection type display apparatus achieved in the first embodiment in the structure adopted in its color separation optical system and the sectional shape of the prisms constituting the polarization beam splitters provided in correspondence to the individual colors of light.

Light emitted from a light source 301 is converted to polarized light that oscillates along the direction perpendicular to the drawing sheet surface at a polarization conversion illuminating device 302, and the light having exited the polarization conversion illuminating device 302 enters a cross dichroic mirror 303 constituted by disposing dichroic mirror 303B having optical characteristics whereby B light is reflected and R light and G light are transmitted and a dichroic mirror 303RG having characteristics whereby R light and G light are reflected and B light is transmitted so that they are both set perpendicular to the drawing sheet surface containing the optical axis of the light from the light source and intersect each other at a right angle. At the cross dichroic mirror 303, the light undergoes color separation and becomes separated into B light and mixed light of R light and G light advancing in opposite directions and parallel to the drawing sheet surface at a right angle to the optical axis of the incident light.

The B light resulting from the color separation at the color separation optical system enters a deflecting mirror 304 disposed perpendicular to the drawing sheet surface with its optical axis achieving a 38° angle of incidence and is then reflected. The reflected B light enters a deflecting mirror 306 disposed perpendicular to the drawing sheet surface with its optical axis achieving a 59° angle of incidence and then is reflected. It then enters a polarization beam splitter 309B via a field lens 308B, is reflected at a polarization splitter portion perpendicular to the drawing sheet surface and then enters a reflection type light valve 110B.

The mixed light of the R light and the G light resulting from the color separation at the color separation optical system 303 enters a deflecting mirror 305 disposed perpendicular to the drawing sheet surface with its optical axis achieving a 35° angle of incidence and is then reflected. The reflected mixed light enters a dichroic mirror 307 disposed perpendicular to the drawing sheet surface and having characteristics whereby G light is reflected and R light is transmitted with its optical axis achieving a 51° angle of incidence and the mixed light then undergoes color separation at the dichroic mirror 307 to be separated into G light to be reflected and R light to be transmitted. The reflected G light and the transmitted R light respectively travel through field lenses 308G and 308R*, enter polarization beam splitters 309G and 309R, are reflected at the corresponding polarization splitter portions set perpendicular to the drawing sheet surface and exit the polarization beam splitters before entering reflection type light valves 110G and 110R. The optical axes of the individual colors of light entering the polarization beam splitters 309B, 309G and 309R provided in correspondence to the individual colors of light form a right angle to the entry surfaces at the polarization beam splitters 309B, 309G and 309R and the different colors of light enter the corresponding polarization splitter portions at a 42° angle and are then reflected. The reflected light in each color exits the corresponding deflection beam splitter with its optical axis forming a right angle to the exit surface of the beam splitter and enters the reflection type light valve 110B, 110G or 110R corresponding to the color. The polarization beam splitters 309B, 309G and 309R provided in correspondence to the different colors of light are each constituted by bonding via the polarization splitter portion two identical triangular prisms having a sectional shape which is not a right angle triangle and the sectional shape of the polarization beam splitters is a parallelogram.

The different colors of light having been modulated and reflected at the reflection type light valves 110B, 110G and 110R provided in conjunction with the individual colors of light re-enter the polarization beam splitters 309B, 309G and 309R. They then enter the respective polarization splitter portions with their optical axes achieving a 42° angle of incidence, and as they are transmitted through the polarization splitter portions, they are extracted as analyzed light. The analyzed light having been transmitted through each polarization splitter portion exits the corresponding polarization beam splitter through its exit surface with the optical axis forming a right angle to the exit surface. The individual colors of light having exited the polarization beam splitters as the analyzed light passe through spacer members 310B, 310G and 310R disposed between the respective polarization beam splitters and the entry surfaces of the prism 111, 112 and 113 constituting the composite prism which is provided to function as the color composition optical system, before entering the individual prisms 111, 112 and 113 constituting the composite prism. The different colors of light having entered the individual prisms undergo color composition at dichroic films formed between the prisms so as to range perpendicular to the drawing sheet surface, and light resulting from the color composition exits the prism 113 to project a full-color image through a projection lens 315 onto a screen (not shown).

The projection typed is play apparatus in the embodiment, in which the color separation optical system 303 achieves optical paths between the light source 301 and the reflection type light valves corresponding to the individual colors of light that are equal to one another as in the first embodiment, realizes advantages similar to those of the first embodiment.

It is to be noted that while the term "plane of incidence" as used in optics is defined as a plane that contains an incident light beam entering, for instance, an optical member such as a mirror or a prism to become reflected or refracted and a normal vector of the interface at which the light is reflected or refracted, the plane of incidence of light having entered an optical member at which it is reflected in this embodiment matches a plane containing the incident light beam and the reflected light beam. In the embodiment, the polarization splitter portions at the polarization beam splitters 309R, 309G and 309B provided in correspondence to the individual colors of light and the first and second dichroic films at the color composition optical system constitute interfaces, and the surface of the drawing sheet on which FIG. 4 is drawn matches the planes of incidence of the optical axes through which the light enters the individual optical members. Namely, in the embodiment, the planes of incidence through which the optical axes of the light penetrate to enter the polarization splitter portions of the individual polarization beam splitters and the planes of incidence through which the optical axes of the beams penetrate to travel through the first and second dichroic films at the color composition optical system match. In addition, the optical axis of the light from the light source entering the cross dichroic mirror 303 extends parallel to this plane.

Fourth Embodiment

Figure 5:
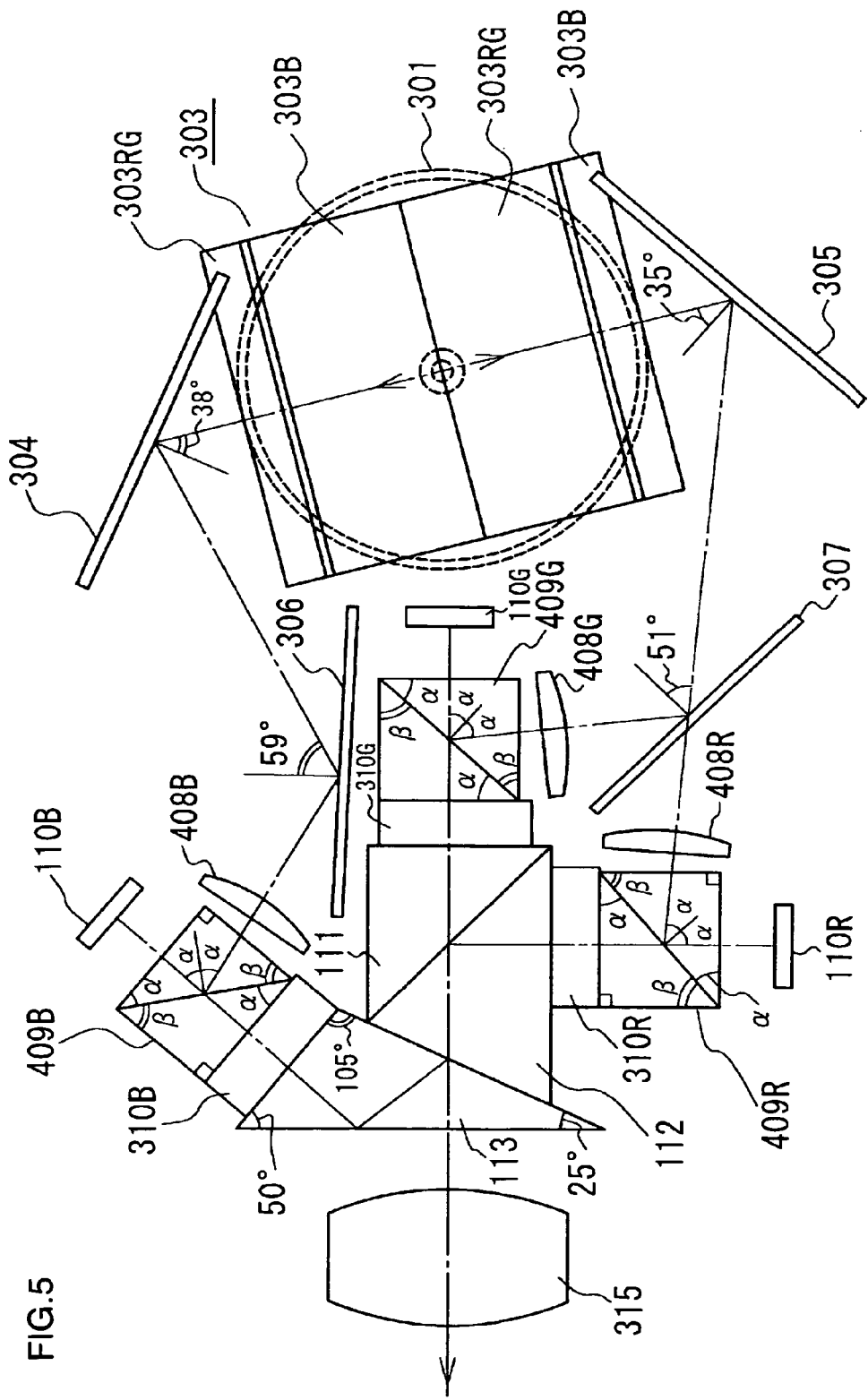
FIG. 5 is a plan view showing the structure adopted in a fourth embodiment of the projection type display apparatus.

FIG. 5 is a plan view showing the structure adopted in the projection type display apparatus in the fourth embodiment. While the projection type display apparatus achieved in this embodiment differs from the projection type display apparatus in the third embodiment in the positional arrangement adopted for the light source and part of the color separation optical system and in the sectional shape of the prisms constituting the polarization beam splitters provided in correspondence to the individual colors of light, the color composition optical system and the reflection type light valves assume structures identical to those in the third embodiment, and accordingly, the same reference numerals are assigned to components identical to those in FIG. 4.

As shown in FIG. 5, a light source 301 and a polarization conversion illuminating device 302 (not shown in the figure) in the embodiment are disposed so as to allow the optical axis of light exiting the light source 301 and the polarization conversion illuminating device 302 to extend perpendicular to the drawing sheet surface. Unlike that shown in FIG. 4, a cross dichroic mirror 303 is constituted with a dichroic mirror 303B and a dichroic mirror 303RG intersecting each other at a right angle, which are disposed so that the optical axes of B light and mixed light of R light and G light resulting from the color separation of the light from the light source having entered at a right angle from the lower side of the drawing sheet surface both run parallel to the drawing sheet surface and so that the B light color and the mixed light are reflected indirections opposite from each other. The B light enters a deflecting mirror 304 with its optical axis achieving a 38° angle of incidence and is reflected at the deflecting mirror 304, whereas the mixed light of the R light and the G light enters a deflecting mirror 305 with its optical axis achieving a 35° angle of incidence and is reflected at the deflecting mirror 305. The arrangement of the members beyond the deflecting mirrors 304 and 305 is identical to that adopted in the third embodiment.

It is to be noted that the optical axes of the individual colors of light entering polarization beam splitters 409B, 409G and 409R via the field lenses 408B, 408G and 408R do not need to extend perpendicular to the corresponding entry surfaces. The different colors of light enter the corresponding polarization beam splitters with a 6° angle of incidence in the embodiment. The light in each color having entered the corresponding polarization beam splitter enters the polarization splitter portion with an angle of incidence equal to the apex angle a of the triangular prisms (each having a triangular section with a 90° angle, and an $\alpha$° angle smaller than 45° and $\beta$° angle larger than 45°) constituting the polarization beam splitter. The light reflected at the polarization splitter portion exits the exit surface of the polarization beam splitter at a right angle to the exit surface. The light having exited the polarization beam splitter enters the corresponding light valve, is reflected and exits the light valve. The reflected light then enters the corresponding polarization beam splitter 409B, 409G or 409R with its optical axis running perpendicular to the entry surface (the exit surface through which the light from the light source having been reflected at the polarization splitter portion has exited), enters the polarization splitter portion with an angle of incidence $\alpha$. The light transmitted through the polarization splitter portion is then extracted as analyzed light. The analyzed light exits the exit surface of the polarization beam splitter at a right angle. The different colors of analyzed light travel through the spacer members 310B, 310G and 310R and then undergo color composition at the color composition optical system. The light resulting from the color composition enters a projection lens 315 and is projected onto a screen (not shown).

In this embodiment, too, the lengths of the optical paths of the different colors of light traveling from the light source to the light valves 110R, 110G and 110B provided in correspondence to the individual colors of light are set equal to one another, and thus, a projection type display apparatus achieving advantages similar to those of the other embodiments can be provided.

Fifth Embodiment

Figure 6:
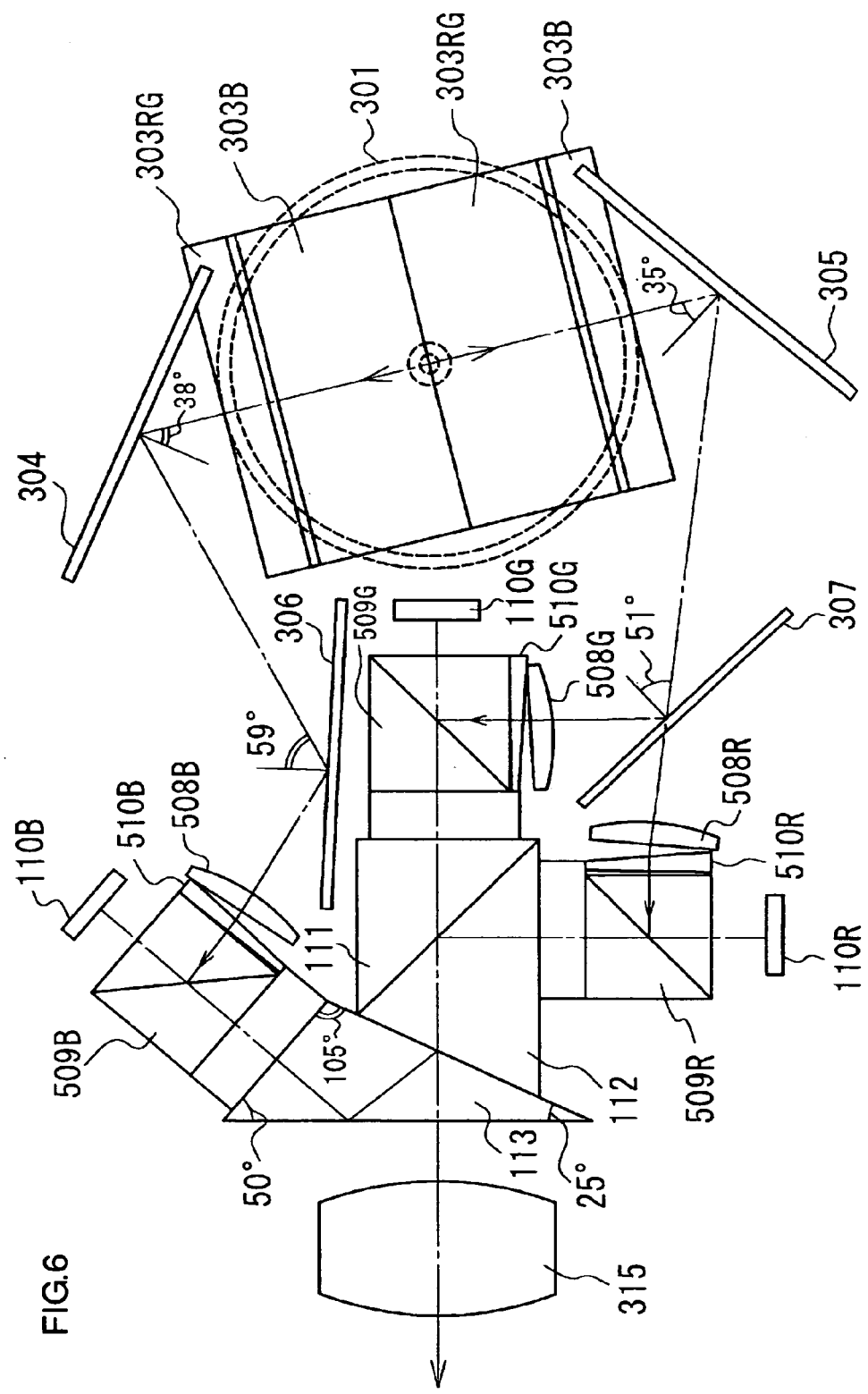
FIG. 6 is a plan view showing the structure adopted in a fifth embodiment of the projection type display apparatus.

FIG. 6 is a plan view showing the structure adopted in the projection type display apparatus in the fifth embodiment. The projection type display apparatus in this embodiment differs from that in the fourth embodiment in the sectional shape of the prisms constituting the polarization beam splitters provided in correspondence to the different colors of light. Since other components adopt structures identical to those in the fourth embodiment, they assume the same reference numerals.

Polarization beam splitters 509B, 509G and 509R having a square section are each constituted with two triangular prisms holding a polarization splitter portion set between them. While the sectional shape of those triangular prisms is a right angle isosceles triangle as in the first embodiment, the embodiment is characterized in that deflection prism members 510B, 510G and 510R are disposed to the front of the entry surfaces at the individual polarization beam splitters so as to ensure that the optical axes of the individual colors of light are set perpendicular to the corresponding entry surfaces.

While the individual colors of light enter the corresponding polarization beam splitters with their optical axes forming an angle of incidence which is not a right angle to the entry surfaces in the fourth embodiment, the light in each color enters the entry surface of the deflection prism disposed to the front of the polarization beam splitter with an angle which is not a right angle, becomes deflected at the deflection prism and then enters the polarization beam splitter at a right angle to the entry surface.

In the projection type display apparatus achieved in this embodiment, too, the lengths of the optical paths of the different colors of light traveling from the light source to the light valves provided in correspondence to the individual colors of light are set equal to one another, and thus, a projection type display apparatus achieving advantages similar to those of the other embodiments can be provided.

It is to be noted that while the deflection prisms are disposed in order to alter the angle of the optical axes of the individual colors of light entering the polarization beam splitters 509R, 509G and 509B in the embodiment, the present invention is not limited to this example, and the field lenses may be formed to achieve the function of the deflection prisms instead of providing separate deflection prisms.

It is also to be noted that the optical axis of the light from the light source entering the cross dichroic mirror 303 is perpendicular to the plane of incidence through which the optical axes of the light beams travel via the polarization splitter portions at the individual polarization beam splitters and the first and second dichroic films at the color composition optical system.

Sixth Embodiment

Figure 8:
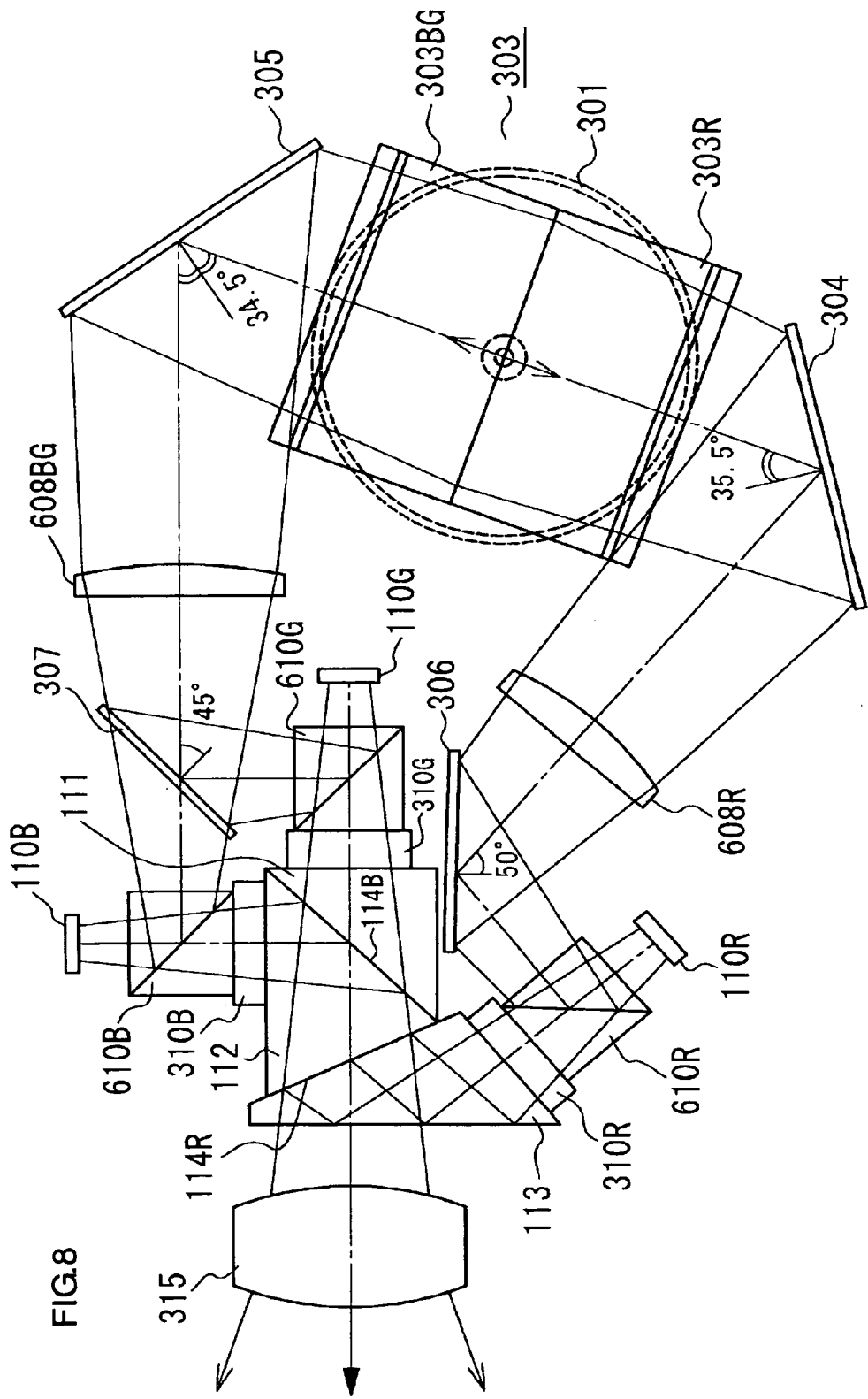
FIG. 8 is a diagram of beams in the projection type display apparatus achieved in a sixth embodiment.

FIG. 8 is a plan view showing the structure adopted in the projection type display apparatus in the sixth embodiment. While the optical axes of the individual colors of light entering the corresponding polarization beam splitters are set perpendicular to the entry surfaces by using deflection prism members in the preceding embodiment, polarization beam splitters 610R, 610G and 610B employed in this embodiment have a square section and each polarization beam splitter is constituted with triangular prisms having a right angle isosceles triangle section. The optical axis of the light in each color resulting from the color separation enters the corresponding polarization beam splitter at a right angle to the entry surface, enters the polarization splitter portion with a 45° angle of incidence, is reflected at the polarization splitter portion and enters the corresponding reflection type light valve.

The optical axis of the light originating from a light source 301 extends perpendicular to the drawing sheet surface from the lower side toward the upper side and then enters a cross dichroic mirror 303. The cross dichroic mirror 303 is achieved by disposing a dichroic mirror 303R which reflects R light and allows B light and G light to be transmitted and a dichroic mirror 303BG that reflects G light and B light and allows R light to be transmitted so that they intersect each other at a right angle. The cross dichroic mirror 303 is positioned so that light from a light source undergoes color separation at the cross dichroic mirror 303 to become separated into R light and mixed light of G light and B light having their optical axes extending parallel to the drawing sheet surface and along directions opposite from each other. The R light having become separated enters a deflecting mirror 304 with its optical axis achieving a 35.5° angle of incidence and is reflected at the deflecting mirror 304. The reflected R light travels through a field lens 608R, enters a deflecting mirror 306 with a 50° angle of incidence and then is reflected. The reflected R light then enters the polarization beam splitter 610R.

The mixed light containing the G light and the B light resulting from the color separation, on the other hand, enters a deflecting mirror 305 with its optical axis achieving a 34.5° angle of incidence and then is reflected. The reflected mixed light travels through a field lens 608BG and enters a dichroic mirror 307 which reflects G light and allows B light to be transmitted with a 45° angle of incidence. The mixed light is thus separated into the G light to be reflected and the R light to be transmitted through and the G light and the R light respectively enter the polarization beam splitters 610G and 610B.

The individual colors of light resulting from the color separation enter the corresponding reflection type light valves via the polarization beam splitters provided in conjunction with the different colors of light. In this embodiment, the lengths of the optical paths of the different colors of light extending from the light source to the reflection type light valves are equal to one another. The dichroic mirror 307 used to separate the G light and the B light from each other is disposed between the field lens 608BG and the polarization beam splitters for B light and G light, and thus is set at a position at which telecentricity is achieved for the B color principal ray and the G color principal rays among the principal ray defined at an aperture in a projection lens 315, thereby reducing the extent of color shading occurring during the color separation.

The individual colors of light having exited the corresponding reflection type light valves are analyzed at the polarization splitter portions of the polarization beam splitters and then undergo color composition at the color composition optical system as in the previous embodiment. The resulting composite light is then projected onto a screen (not shown) via the projection lens 315. While the optical axis of the light emitted from the light source and entering the cross dichroic mirror 303 for color separation extends perpendicular to the drawing sheet surface in the embodiment, the advantages similar to those of the embodiment may be achieved by adopting the arrangement shown in FIG. 4 in which the light from the light source enters the cross dichroic mirror with its optical axis running parallel to the drawing sheet surface and the light then becomes separated into R light and mixed light of G light and G light along a direction parallel to the drawing sheet surface.

Seventh Embodiment

Figure 9:
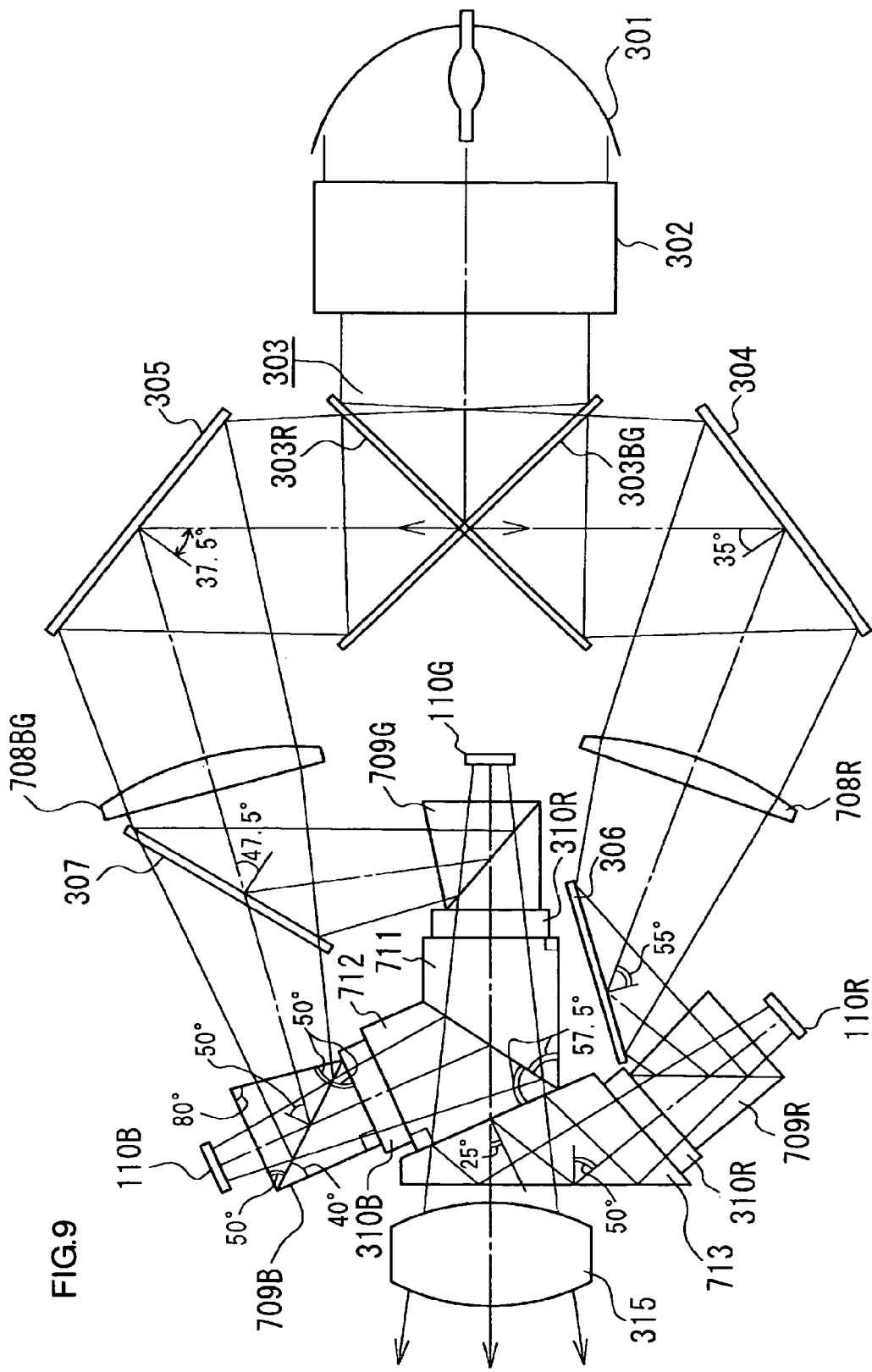
FIG. 9 is a diagram of beams in the projection type display apparatus achieved in a seventh embodiment.

FIG. 9 is a plan view showing the structure adopted in the projection typed is play apparatus in the seventh embodiment. In the projection type display apparatuses achieved in the first through sixth embodiments of the present invention, the different colors of light enter the polarization splitter portions at the corresponding polarization beam splitters with their optical axes achieving angles of incidence in a 42° to 45° range, since the polarization beam splitters are formed by using prisms constituted of optical glass with a refractive index of approximately 1.84. Generally speaking, glass with a small absolute value representing the constant of photo elasticity relative to the incident light tends to have a relatively large refractive index such as this.

The prisms constituting the polarization beam splitters used in this embodiment, on the other hand, are formed from glass having a photo elasticity constant, the absolute value of which is small, and a refractive index of approximately 1.6. At a polarization beam splitter that includes prisms formed from glass with a relatively small refractive index such as these, the angle of incidence formed by the optical axis of the light entering the polarization splitter portion cannot be set equal to or smaller than 45°. In order to assure the polarization separation function and the analysis function required in the projection type display apparatus, an angle of incidence equal to or greater than 45° must be achieved.

The refractive index of the prisms constituting polarization beam splitters 709R, 709G and 709B in the projection type display apparatus in the embodiment shown in FIG. 9 is 1.6 and the angle of incidence formed by the optical axes of the different colors of light entering the polarization splitter portions is set to 50° so as to assure desirable polarization separation and analysis functions.

Light emitted from a light source 301 is converted to linearly polarized light oscillating along the direction perpendicular to the drawing sheet surface and the linearly polarized light then exits the polarization conversion illuminating device 302. The light having exited the polarization conversion illuminating device 302 undergoes color separation at a cross dichroic mirror 303 to be separated into R light and mixed light containing B light and G light with their optical axes running in directions opposite from each other, at a right angle to the optical axis of the incident light. The mixed light of the G light and the B light resulting from the color separation enters a deflecting mirror 305 with a 37.5° angle of incidence and is reflected. The reflected mixed light travels through a field lens 708BG, enters a dichroic mirror 307 that reflects G light and allows B light to be transmitted through with its optical axis forming a 47.5° angle of incidence and becomes separated into G light to be reflected and B light to be transmitted and advance ahead. The G light and the B light having become separated from each other respectively enter the polarization beam splitters 709G and 709B with their optical axes forming a right angle to the entry surfaces. The different colors of light having entered the respective polarization beam splitters 709G and 709B enter the polarization splitter portions with a 50° angle of incidence, undergo the process of polarization separation and then are reflected. The individual colors of reflected light then enters the reflection type light valves 110G and 111B.

The R light having become separated at the cross dichroic mirror 303, on the other hand, enters a deflecting mirror 304 with its optical axis forming a 35° angle of incidence and is then reflected. The reflected R light travels through a field lens 708R, enters a deflecting mirror 306 with its optical axis forming a 55 degree angle of incidence and is then reflected. The reflected light enters the polarization beam splitter 709R with its optical axis forming a right angle to the entry surface. The light having entered the polarization beam splitter 709R enters the polarization splitter portion with a 50° angle of incidence, undergoes the process of polarization separation and is reflected. The reflected light then enters a reflection type light valve 110R.

The different colors of light having been reflected at and having exited the reflection type light valves provided in conjunction with the corresponding colors of light are analyzed at the polarization beam splitters and the individual colors of transmitted light exit the polarization beam splitters as analyzed light. Subsequently, the different colors of light undergo color composition at the color composition optical system. Of the prisms constituting each of the polarization beam splitters 709B, 709G and 709R used in the embodiment, the section of the entry-side triangular prism is an isosceles triangle with 50°, 50° and 80° angles, and the polarization splitter film is formed at the surface facing opposite the 80° apex. The section of the other prism is a right angle triangle with 40°, 50° and 90° angles, and the polarization beam splitter is formed by bonding the surface of this prism facing opposite the 90° apex to the polarization splitter portion.

The different colors of analyzed light having exited the polarization beam splitters corresponding to the individual colors of light enter prisms 711, 712 and 713 constituting the color composition optical system via spacer members 310G, 310B and 310R respectively. While the shape of the prism 713 constituting part of the color composition optical system is identical to that of the prism 113 used in the first through sixth embodiments, the shapes of the prisms 711 and 712 used in the embodiment are different from those of the prisms 111 and 112.

The prisms 711 and 712 are triangular prisms identical to each other with substantially triangular sections having 90°, 57.5° and 32.5° apexes. The surfaces of the prisms 711 and 712 each facing opposite the respective 90° apex are bonded via a dichroic film which allows G light to be transmitted and it reflects B light so that the 57.5° apexes of the two prisms are set side-by-side. The composite prism is formed by bonding the prism 712 and the prism 713 via a dichroic film which reflects R light and allows G light and B light to be transmitted. The 32.5° apexes of the prisms 711 and 712 are cut off in the embodiment, so as to ensure that the optical paths of the B light and the G light extend completely unblocked and also to create a space where the dichroic mirror 307 is disposed.

In this embodiment, too, the field lens 708BG is disposed between the deflecting mirror 305 and the dichroic mirror 307 and thus, the dichroic mirror 307 is set at a position at which telecentricity is achieved to allow the G color principal ray and the B color principal ray among the principal rays defined at the aperture in the projection lens 315 to run parallel to the optical axes is achieved. As a result, the extent of color shading occurring while the G light and the B light become separated from each other is lowered, thereby achieving desirable color separation.

Furthermore, when this embodiment is adopted, the refractive indices of the prisms constituting the polarization beam splitters provided in correspondence to the individual colors of light may be lowered to set the angles of incidence formed by the optical axes of light entering the polarization splitter portions equal to or greater than 45°. In such a case, too, the problem of cross dichroic prisms used in the related art, i.e., the occurrence of an uneven image area in the projected image due to the presence of the adhesive layer at the center of the cross dichroic prism, can be prevented by using three triangular prisms with substantially triangular sections to constitute a color composition optical system and disposing two dichroic films without allowing them to intersect each other in the projection type display apparatus.

Eighth Embodiment

Figure 10:
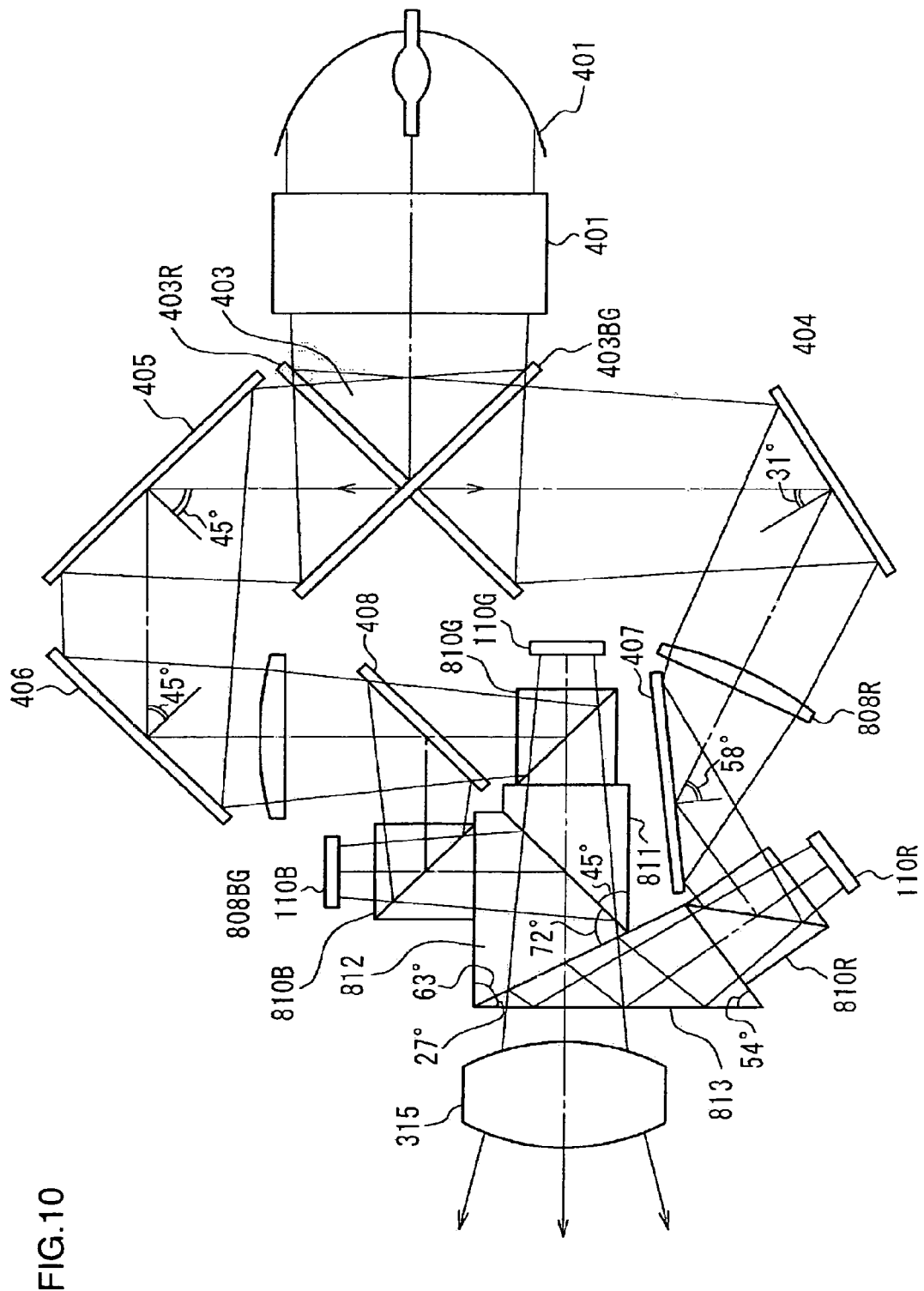
FIG. 10 is a plan view showing the structure adopted in an eighth embodiment of the projection type display apparatus.

FIG. 10 is a plan view showing the structure of the projection type display apparatus achieved in the eighth embodiment. Light emitted from a light source 401 is converted to polarized light that vibrates along a direction perpendicular to the drawing sheet surface at a polarization conversion illuminating device 402. The light having exited the polarization conversion illuminating device 402 undergoes color separation at a cross dichroic mirror 403 to be separated into R light and mixed light containing G light and B light, which are to advance in directions opposite from each other both extending at a right angle to the optical axis of the incident light. It is to be noted that the directions in which the light at the center of the R light flux and the light at the center of the mixed light flux containing the G light and the B light advance after becoming separated at the cross dichroic mirror 403 both form a right angle to the direction along which the light at the center of the light flux resulting from the color composition at the color composition optical system advances.

The mixed light containing the G light and the B light resulting from the color separation enters a polarizing mirror 405 with the light at the center of the light flux (indicated by the one-point chain line in FIG. 10) forming a 45° angle of incidence and becomes deflected by 90°. It then enters a deflecting mirror 406 with the light at the center of the light flux forming a 45° angle of incidence, is deflected by 90° and advances along the direction opposite from the direction in which the light enters the deflecting mirror 405. The mixed light containing the G light and the B light travels through a field lens 808BG and enters a dichroic mirror 408 having characteristics whereby G light is transmitted and B light is reflected with the light at the center of the light flux forming a 45° angle of incidence to be separated into the G light which is transmitted and the B light which is reflected at a right angle.

The G light and the B light resulting from the color separation respectively enter polarization beam splitters 810G and 810B provided in correspondence to the individual colors of light. The polarization beam splitters 810G and 810B are each constituted by bonding two prisms with a right angle isosceles triangle section via a polarization split portion and the polarization beam splitters both have a square section. The G light and the B light resulting from the color separation enter the polarization beam splitters 81G and 810B perpendicular to the entry surfaces, enter the respective polarization split portions with a 45° angle of incidence, are reflected and exit perpendicular to the exit surfaces. The light beams having exited the polarization beam splitters enter the reflection type light valves 110G and 110B respectively.

The R light resulting from the color separation at the cross dichroic mirror 403 enters a deflecting mirror 404 with the light at the center of the light flux forming a 31° angle of incidence and is reflected. The reflected R light travels through a field lens 808R, enters a deflecting mirror 407 with the light at the center of the light flux forming a 58° angle of incidence and is reflected. The deflecting mirror 407 is disposed in the vicinity of a prism 811 constituting a color composition optical system 813. The R light reflected at the deflecting mirror 407 enters a polarization beam splitter 810R perpendicular to the entry surface, enters the polarization split portion with a 45° angle of incidence, is reflected and exits perpendicular to the exit surface. The light having exited the polarization beam splitter then enters a reflection type light valve 110R. It is to be noted that the polarization beam splitter 810R adopts a form identical to that of the polarization beam splitters 810G and 810B. By forming the optical paths from the light source to the reflection type light valves as described above, the lengths of the optical paths of the individual colors of light extending from the light source to the light valves for the different colors of light, can be equalized.

The individual colors of light having been modulated at the corresponding reflection type light valves 110B, 110G and 110R, then having been reflected and having exited the reflection type light valves reenter the polarization beam splitters 810B, 810G and 810R for the different colors of light, where the modulated light is analyzed as light which is transmitted through the polarization split portions and is allowed to exit the polarization beam splitters. The individual colors of light having been analyzed then enter the color composition optical system. The color composition optical system is constituted with three prisms 811, 812 and 813. The prism 811 is a triangular prism with a substantially right angle isosceles triangular section. The prism 812 is a triangular prism having a substantially triangular section having a 63° apex, a 72° apex and a 45° apex. The surface of the prism 812 facing opposite the 63° apex and the surface of the prism 811 facing opposite the right angle apex are bonded to each other via a dichroic film having characteristics whereby G light is transmitted and B light is reflected. The prism 813 is a triangular prism having a substantially triangular section with a 27° apex, a 54° apex and a 90° apex. The surface of the prism 813 facing opposite the 54° apex and the surface of the prism 812 facing opposite the 45° apex are bonded to each other via a dichroic film having characteristics whereby R light is reflected and G light and B light are transmitted so as to set the 27° apex of the prism 813 and the 63° apex of the prism 812 next to each other.

The G light having exited the reflection type light valve 110G and having been analyzed at the polarization beam splitter 810G enters the prism 811 with the light at the center of the light flux forming a right angle to the entry surface and is transmitted through the dichroic film present between the prism 811 and the prism 812. The B light having exited the reflection type light valve 110B and having been analyzed at the polarization beam splitter 810B enters the prism 812 with the light at the center of the light flux forming a right angle to the entry surface, is reflected at the dichroic film present between the prisms 811 and 812 and undergoes color composition to become combined with the G light. The G light and the B light having undergone the color composition are transmitted through the dichroic film disposed at the bonding surface of the prism 812 and the prism 813. The light having exited the reflection type light valve 110R and having been analyzed at the polarization beam splitter 810R then enters the entry surface at the prism 813 facing opposite the 27° apex with the light at the center of the light flux forming a right angle to the entry surface. After entering the prism 813, the R light is totally reflected at the surface facing opposite the 90° apex, is reflected at the dichroic film at the boundary with the prism 812 and becomes combined with the G light and the B light. The B light, the G light and the R light having undergone the color composition exit the color composition optical system through the surface of the prism 813 facing opposite the 90° apex. The light having exited the color composition optical system then enters a projection lens 315 and is projected onto a screen (not shown).

In this embodiment, too, with the field lens 808BG disposed between the deflecting mirror 406 and the dichroic mirror 408, the dichroic mirror 408 can be set at a position at which the primary rays of the G light and the B light among the primary rays defined at the aperture stop in the projection lens 315 achieve telecentricity so as to advance parallel to the optical axes. Thus, the extent of color shading occurring as the G light and the B light are separated from each other at the dichroic mirror 408 can be lowered to achieve desirable color separation.

By adopting the embodiment, a projection type display apparatus is provided that is free of the problems occurring in the related art when the color composition is executed at a cross dichroic prism. Furthermore, the directions in which the light at the center of the R light flux and the light at the center of the mixed light flux containing the G light and the B light resulting from the color separation at the cross dichroic mirror advance are both set perpendicular to the direction in which the light at the center of the light flux exiting the color composition optical system after undergoing the color composition advances. Thus, the cross dichroic mirror 403 can be disposed near the structural portion that includes the light valves, the polarization beam splitters and the color composition optical system and, as a result, the apparatus can be provided as a compact unit. It is to be noted that a projection type display apparatus achieving similar advantages can be provided by disposing the light source 401 in the embodiment as shown in FIGS. 5, 6 and 8 so as to emit light from a direction perpendicular to the drawing sheet surface and disposing the cross dichroic mirror accordingly, as well.

While the apex with the smallest angle in the prism at the color composition system closest to the projection lens is set to 25° or 27° in the first through eighth embodiments explained above, the smallest angle may be set to another value as long as it is within a range of 23° to 28°. In addition, while the light corresponding to a single color resulting from the color separation, which is executed to separate the light from the light source into mixed light containing two colors of light and light corresponding to a single color, enters the polarization beam splitter via two deflecting mirrors in the first to eighth embodiments, it is desirable to dispose the second deflecting mirror near the color composition system. Furthermore, the number of deflecting mirrors does not need to be two, and three or more deflecting mirrors may be used.

The above described embodiments are examples and various modifications can be made without departing from the spirit and scope of the invention.

What is claimed is:

1. A projection type display apparatus comprising:
a color separation optical system that executes color separation to separate light emitted from a light source into first color light, second color light and third color light;
reflection type light valves provided each in correspondence to one of the first color light through the third color light;
polarization beam splitters provided each in correspondence to one of the first color light through the third color light, which execute polarization separation of the first color light, the second color light and the third color light resulting from the color separation, cause the first color light, the second color light and the third color light to enter the reflection type light valves and analyze light exiting the reflection type light valves after being modulated at the reflection type light valves;
a color composition optical system having a first prism, a second prism and a third prism having shapes of substantially triangular columns with the first prism and the second prism bonded via a first dichroic film achieving characteristics whereby the first color light is transmitted and the second color light is reflected and the second prism and the third prism bonded via a second dichroic film achieving characteristics whereby the third color light is reflected and the first color light and the second color light are transmitted, in which the analyzed first color light having entered through the first prism and the analyzed second color light having entered through the second prism undergo color composition at the first dichroic film and composite light constituted of the analyzed first color light and the analyzed second color light and the analyzed third color light having entered through the third prism undergo color composition at the second dichroic film; and a projection lens that projects light resulting from the color composition, wherein:

lengths of optical paths through which the first color light through the third color light travel from the light source to the reflection type light valves are equal to one another.

2. A projection type display apparatus according to claim 1, wherein:

the analyzed third color light having entered through the third prism is first totally reflected at a side surface of the third prism facing opposite the projection lens and then undergoes the color composition at the second dichroic film to become combined with the composite light constituted of the analyzed first color light and the analyzed second color light.

3. A projection type display apparatus according to claim 1, wherein:

the color separation optical system comprises:

a first dichroic mirror that executes color separation to separate the light emitted from the light source into mixed light containing the first color light and the second color light and the third color light; and a second dichroic mirror disposed non-parallel with the first dichroic mirror, that executes color separation to separate the mixed light into the first color light and the second color light.

4. A projection type display apparatus according to claim 3, further comprising:

at least one deflecting mirror disposed in an optical path between the first dichroic mirror and the second dichroic mirror, which equalizes the length of the optical path from the light source to the reflection type light valve for the first color light and the length of the optical path from the light source to the reflection type light valve for the second color light; and at least two deflecting mirrors disposed in an optical path between the first dichroic mirror and the polarization beam splitter for the third color light, which equalize the length of the optical path from the light source to the reflection type light valve for the third color light and the length of the optical path from the light source to the reflection type light valve for the first color light.

5. A projection type display apparatus according to claim 4, wherein:

at least one of the deflecting mirrors disposed in the optical path between the first dichroic mirror and the polarization beam splitter for the third color light is set near the color composition optical system.

6. A projection type display apparatus according to claim 4, further comprising:

a first field lens disposed in the optical path between the first dichroic mirror and the second dichroic mirror; and a second field lens disposed in the optical path between the first dichroic mirror and the polarization beam splitter for the third color light.

7. A projection type display apparatus according to claim 1, wherein:

the color separation optical system comprises:

a cross dichroic mirror achieved by disposing a first dichroic mirror having characteristics where by the first color light and the second color light are reflected and the third color light is transmitted and a second dichroic mirror having characteristics whereby the third color light is reflected and the first color light and the second color light are transmitted so that the first dichroic mirror and the second dichroic mirror intersect each other at a right angle, which executes color separation to separate the light from the light source into mixed light containing the first color light and the second color light and the third color light; and a third dichroic mirror that executes color separation to separate the mixed light resulting from the color separation at the cross dichroic mirror into the first color light and the second color light.

8. A projection type display apparatus according to claim 7, further comprising:

at least one deflecting mirror disposed in an optical path between the cross dichroic mirror and the third dichroic mirror, which equalizes the length of the optical path from the light source to the reflection type light valve for the first color light and the length of the optical path from the light source to the reflection type light valve for the second color light; and at least two deflecting mirrors disposed in an optical path between the cross dichroic mirror and the polarization beam splitter for the third color light, which equalize the length of the optical path from the light source to the reflection type light valve for the third color light and the length of the optical path from the light source to the reflection type light valve for the first color light.

9. A projection type display apparatus according to claim 8, wherein:

at least one of the two deflecting mirrors disposed in the optical path between the cross dichroic mirror and the polarization beam splitter for the third color light is set near the color composition optical system.

10. A projection type display apparatus according to claim 8, wherein:

the polarization beam splitters provided in conjunction with the first color light through the third color light each include two triangular prisms having a right angle isosceles triangle section; and light at a center of a light flux of each color light resulting from the color separation enters the polarization beam splitter perpendicular to an entry surface at the polarization beam splitter.

11. A projection type display apparatus according to claim 8, wherein:

the polarization beam splitters provided in conjunction with the first color light through the third color light each include two triangular prisms having a section with a shape of a right angle triangle having a right angle and an angle larger than 45°; and light at a center of a light flux of each color light resulting from the color separation enters a polarization splitter portion of the polarization beam splitter with an angle of incidence larger than 45°.

12. A projection type display apparatus according to claim 8, wherein:

the polarization beam splitters provided in conjunction with the first color light through the third color light each include two triangular prisms having an isosceles triangle section; and light at a center of a light flux of each color light resulting from the color separation enters the polarization beam splitter perpendicular to an entry surface at the polarization beam splitter and light at a center of a light flux of exiting light exits to the reflection type light valve along a direction perpendicular to an exit surface.

13. A projection type display apparatus according to claim 8, wherein:
an intersecting axis of the cross dichroic mirror having the first dichroic mirror and the second dichroic mirror is set perpendicular to a plane containing an optical axis of the color composition optical system; and
light at a center of a light flux emitted from the light source advances parallel to the plane containing the optical axis of the color composition optical system.

14. A projection type display apparatus according to claim 8, wherein:
an intersecting axis of the cross dichroic mirror having the first dichroic mirror and the second dichroic mirror is set parallel to a plane containing an optical axis of the color composition optical system; and
light at a center of a light flux emitted from the light source advances perpendicular to the plane containing the optical axis of the color composition optical system.

15. A projection type display apparatus according to claim 7, further comprising:
two deflecting mirrors disposed in an optical path between the cross dichroic mirror and the third dichroic mirror, which equalize the length of the optical path from the light source to the reflection type light valve for the first color light and the length of the optical path from the light source to the reflection type light valve for the second color light; and
two deflecting mirrors disposed in an optical path between the cross dichroic mirror and the polarization beam splitter for the third color light, which equalize the length of the optical path from the light source to the reflection type light valve for the third color light and the length of the optical path from the light source to the reflection type light valve for the first color light.

16. A projection type display apparatus according to claim 15, wherein:
the mixed light containing the first color light and the second color light resulting from the color separation at the cross dichroic mirror is deflected by 180° by the two deflecting mirrors disposed in the optical path between the cross dichroic mirror and the polarization beam splitter for the third color light.

17. A projection type display apparatus according to claim 16, wherein:
one of the two deflecting mirrors disposed in the optical path between the cross dichroic mirror and the polarization beam splitter for the third color light is set near the color composition optical system.

18. A projection type display apparatus comprising:
a color separation optical system that executes color separation to separate light source light emitted from a light source into first color light, second color light and third color light;
light valves provided each in correspondence to one of the first color light through the third color light;
a color composition optical system having a first prism, a second prism and a third prism assuming shapes of substantially triangular columns with the first prism and the second prism bonded via a first dichroic film achieving characteristics whereby the first color light is transmitted and the second color light is reflected and the second prism and the third prism bonded via a second dichroic film achieving characteristics whereby the third color light is reflected and the first color light and the second color light are transmitted, in which the first color light having entered through the first prism and the second color light having entered the second prism under go color composition at the first dichroic film and composite light constituted of the first color light and the second color light and the third color light having entered through the third prism undergo color composition at the second dichroic film; and
a projection lens that projects light resulting from the color composition, wherein:
lengths of optical paths through which the individual colors of light travel from the light source to the light valves are equal to one another.

19. A projection type display apparatus according to claim 18, wherein:
the analyzed third color light having entered through the third prism is first totally reflected at a side surface of the third prism facing opposite the projection lens and then undergoes the color composition at the second dichroic film to become combined with the composite light constituted of the analyzed first color light and the analyzed second color light.

20. A projection type display apparatus according to claim 18, wherein:
the color separation optical system comprises:
a first dichroic mirror that executes color separation to separate the light emitted from the light source into mixed light containing the first color light and the second color light and the third color light; and
a second dichroic mirror disposed non-parallel with the first dichroic mirror, that executes color separation to separate the mixed light into the first color light and the second color light.

21. A projection type display apparatus according to claim 20, further comprising:
at least one deflecting mirror disposed in an optical path between the first dichroic mirror and the second dichroic mirror, which equalizes the length of the optical path from the light source to the light valve for the first color light and the length of the optical path from the light source to the light valve for the second color light;
at least two deflecting mirrors disposed in an optical path between the first dichroic mirror and the light valve for the third color light, which equalize the length of the optical path from the light source to the light valve for the third color light and the length of the optical path from the light source to the light valve for the first color light.

22. A projection type display apparatus according to claim 21, wherein:
at least one of the two deflecting mirrors disposed in the optical path between the first dichroic mirror and the light valve for the third color light is set near the color composition optical system.

23. A projection type display apparatus according to claim 18, wherein:
the color separation optical system comprises:
a cross dichroic mirror constituted by disposing a first dichroic mirror achieving characteristics whereby the first color light and the second color light are reflected and the third color light is transmitted and a second dichroic mirror achieving characteristics whereby the third color light is reflected and the first color light and the second color light are transmitted so that the first dichroic mirror and the second dichroic mirror intersect each other at a right angle, which executes color separation to separate the light from the light source into mixed light containing the first color light and the second color light and the third color light; and a third dichroic mirror that executes color separation to separate the mixed light resulting from the color separation at the cross dichroic mirror into the first color light and the second color light.

24. A projection type display apparatus according to claim 23, further comprising:

at least one deflecting mirror disposed in an optical path between the cross dichroic mirror and the third dichroic mirror, which equalizes the length of the optical path from the light source to the light valve for the first color light and the length of the optical path from the light source to the light valve for the second color light;

at least two deflecting mirrors disposed in an optical path between the cross dichroic mirror and the light valve for the third color light, which equalize the length of the optical path from the light source to the light valve for the third color light and the length of the optical path from the light source to the light valve for the first color light.

25. A projection type display apparatus according to claim 24, wherein:

at least one of the two deflecting mirrors disposed in the optical path between the cross dichroic mirror and the light valve for the third color light is set near the color composition optical system.

26. A projection type display apparatus according to claim 1, wherein:

the color separation optical system and the color composition optical system are disposed within a single plane.

27. A projection type display apparatus according to claim 18, wherein:

the color separation optical system and the color composition optical system are disposed within a single plane.

* * * * *